(12) United States Patent
Rooney, III et al.

(10) Patent No.: US 7,486,591 B2
(45) Date of Patent: Feb. 3, 2009

(54) SONAR SYSTEM AND METHOD PROVIDING LOW PROBABILITY OF IMPACT ON MARINE MAMMALS

(75) Inventors: James H. Rooney, III, Harvard, MA (US); Jesse T. Gratke, Royal Oak, MI (US); Ryan J. Lewis, Bristol, RI (US); Michael F. Janik, Portsmouth, RI (US); Thomas B. Pederson, Portsmouth, RI (US); William C. Zurawski, West Greenwich, RI (US); James H. Miller, Kingston, RI (US)

(73) Assignee: Raytheon Company, Waltham, MA (US)

( * ) Notice: Subject to any disclaimer, the term of this patent is extended or adjusted under 35 U.S.C. 154(b) by 97 days.

(21) Appl. No.: 11/548,418

(22) Filed: Oct. 11, 2006
(Under 37 CFR 1.47)

(65) Prior Publication Data
US 2008/0043574 A1 Feb. 21, 2008

Related U.S. Application Data

(60) Provisional application No. 60/728,955, filed on Oct. 21, 2005.

(51) Int. Cl.
*G01S 7/52* (2006.01)
(52) U.S. Cl. .................................................. 367/137
(58) Field of Classification Search .................. 367/87, 367/88, 99, 100, 131.134, 137
See application file for complete search history.

(56) References Cited

U.S. PATENT DOCUMENTS

| | | | |
|---|---|---|---|
| 4,955,002 A | 9/1990 | Campbell | |
| 6,130,641 A | 10/2000 | Kracutner et al. | |
| 7,035,166 B2 | 4/2006 | Zimmerman et al. | |
| 7,123,546 B2 | 10/2006 | Zimmerman et al. | |
| 2008/0043574 A1* | 2/2008 | Rooney et al. | 367/87 |

FOREIGN PATENT DOCUMENTS

| | | |
|---|---|---|
| WO | WO 02/077663 A1 | 10/2002 |
| WO | WO 2007050289 A1 * | 5/2007 |

OTHER PUBLICATIONS

National Oceanic and Atmospheric Administration, et al., "Small Takes of Marine Mammals Incidental to Specified Activities; Marine Seismic Survey in the Gulf of Alaska, Northeastern Pacific Ocean", Federal Register, vol. 69, No. 120, Jun. 23, 2004, pp. 34996-35011.*

(Continued)

*Primary Examiner*—Dan Pihulic
(74) *Attorney, Agent, or Firm*—Daly, Crowley, Mofford & Durkee, LLP

(57) ABSTRACT

Low probability of marine mammal impact (LPMMI) sound signals have a modulation component selected to reduce a behavioral response from a marine mammal from that which would occur when transmitting another sound signal having approximately the same time duration component, approximately the same bandwidth component, and approximately the same center frequency component as the LPMMI waveform but having a modulation component comprising a frequency modulation.

30 Claims, 8 Drawing Sheets

OTHER PUBLICATIONS

Jourdain et al.; "Use of large bandwidth-duration binary phase shift keying signals in target delay Doppler measurements;" The Journal of the Acoustical Society of America; Jul. 1991; pp. 299-309.

Wong et al.; "Pulse-Diverse Radar/Sonar FSK-PSK Waveform Design to Emphasize/De-emphasize Designated Doppler-Delay Sectors;" Record of the IEEE 2000 International Radar Conference; May 2000; XP002422308; ISBN: 0-7803-5776-0; pp. 745-749.

Xiang et al.; "Fast M-sequence Transform for Quasi-Backscatter Sonar in Fisheries and Zooplanton Survey Applications;" 2004 7th International Conference on Signal Processing Proceedings); Aug. 2004; XP002422307; ISBN: 0-7803-8406-7; pp. 2433-4236.

PCT Search Report and Written Opinion for PCT Application No. PCT/US2006/039686; dated Mar. 13, 2007.

* cited by examiner

SONAR SYSTEM AND METHOD PROVIDING LOW PROBABILITY OF IMPACT ON MARINE MAMMALS

CROSS REFERENCE TO RELATED APPLICATIONS

This application claims the benefit under 35 U.S.C. §119 (e) of U.S. Provisional Application No. 60/728,955 filed Oct. 21, 2005, which application is incorporated herein by reference in its entirety.

STATEMENT REGARDING FEDERALLY SPONSORED RESEARCH

Not Applicable

FIELD OF THE INVENTION

This invention relates generally to sonar systems and methods and, more particularly, to active sonar systems and methods that transmit sound signals into the water, which provide a reduced impact on marine mammals.

BACKGROUND OF THE INVENTION

There have been many incidents of marine mammal strandings that have been locationally and temporally coincident with naval exercises during which active sonar systems were used. There has been a public perception that sound generated by the active sonar systems causes tissue damage to marine mammals, tending to cause the marine mammals to beach themselves. As is known, beaching has caused death in some marine mammals.

As a result of the public's negative perception of naval active sonar systems, the United States Navy has invested a large amount of time and money conducting scientific research into the effects of low frequency underwater sound on humans and on marine mammals, which has resulted in an environmental impact statement and ongoing investigations into the causes of these marine mammal incidents. Public controversy exists over the use of the naval active sonar system and other mid-frequency active sonar systems.

It would be useful to provide an active sonar system that is generally harmless to marine mammals. However, such a system must still meet the Navy's mission requirements for detection, localization, and/or classification of underwater targets.

A hypothesis has been generated regarding the impact of naval mid-frequency active sonar systems upon marine mammals. In particular, it has been hypothesized that the particular frequency modulated active sound signals transmitted by the mid-frequency active sonar systems share similar sound characteristics with natural sound signals generated by killer whales. The hypothesis further suggests that when the marine mammals detect one or more of such frequency modulated sound signals, in particular, sound signals generated by sonar systems aboard a plurality of navel ships maneuvering to triangulate upon an underwater target, the marine mammals may perceive the sound signals to be generated by a pod of killer whales hunting prey. This perception by the affected marine mammals may elicit a behavioral "flight" response to flee the area, which can result in strandings.

It has been further hypothesized that the beaked whale species is particularly affected by these particular mid-frequency frequency modulated sound signals and triangulation maneuvers. As is known, approximately one quarter of the world's eighty whale and dolphin species belongs to the family of beaked whales (Ziphiidae), however, since many of these marine mammals favor a deep water habitat, study and knowledge of these marine mammals and their behaviors is relatively new.

While some have hypothesized that marine mammals are physiologically damaged by the sound emitted by the naval active sonar systems, necropsies of beaked whales that have beached themselves after naval active sonar exercises have shown no conclusive evidence of hemorrhaging or other physiological damage resulting from the active sonar systems, in particular, resulting from high sound pressure levels associated with the active sonar systems. Also, there has been no evidence that the marine mammals have experienced the bends (outgasing of nitrogen into the blood stream due to rapid depressurization from rapid depth change). Therefore, the strandings of beaked whales are believed to be a result of a behavior in response to the particular frequency modulated sound signals generated by naval active sonar systems.

Referring to FIGS. 1-1B, a sound recording of an Orca (killer whale) is presented in a variety of graphical formats. Referring first to FIG. 1, a graph 10 has a horizontal axis in units of time in seconds and a vertical axis in units of amplitude in arbitrary units. A curve 12 is a time waveform indicative of an exemplary sound signal generated by an Orca. The time waveform 12 has been normalized to contain peak amplitudes that reside within amplitude bounds of +/−1.0. It can be seen from this example of sound generated by the Orca that this waveform has a duration of approximately one second. The curve 12 has first and a second portion 12a, 12b, respectively, which are not necessarily characteristic of all sounds generated by Orcas.

Referring now to FIG. 1A, a graph 20 has a horizontal axis in units of frequency in Hertz and a vertical axis in units of amplitude in decibels. A curve 22, which is a power spectrum, was computed by calculating a single Fourier Transform record over the entire duration of the Orca transmission shown in waveform 12 of FIG. 1. The power spectrum curve 22 has been normalized to have a peak of zero decibels. A peak 22a is associated with background ocean noise. A peak 22b is representative of sound generated by the Orca.

Referring now to FIG. 1B, a graph 30 includes a horizontal scale in units of frequency and a vertical scale in units of time in seconds. The graph 30 is a spectrogram representative of a sound signal generated by an Orca in accordance with the time waveform 12 of FIG. 1. A first curve 32a spans a time period of approximately one second. A second curve 32b spans a time period of approximately 0.5 seconds. A third curve 32c spans a time period of approximately 0.3 seconds. The three curves 32a-32c correspond to the time waveform 12 of FIG. 1 and to the power spectrum 22 of FIG. 1A. Each one of the three curves 32a-32c has a frequency that changes with respect to time, becoming higher in frequency as time progresses. Therefore, each one of the curves 32a-32c is a frequency sweep (also referred to here as a chirp or a frequency modulated sound signal) that tends to increase in frequency with time.

A third dimension is represented in the graph 30 by an intensity of each one of the curves 32a-32c, wherein a darker portion of the curves 32a-32c is representative of a greater sound power.

The spectrogram 30 presented in FIG. 1B is normalized (in accordance with the power spectrum of FIG. 1A) to contain a peak power level of 0 dB. A floor of −40 dB was employed to limit the dynamic range of the levels of the spectrogram 30 to 40 dB. The 40 dB dynamic range is employed to allow a depiction of the spectrogram 30 that could be visually interpreted over a 256-value color map.

The curves 32a-32c represent a complex sound signal generated by the Orca that includes harmonically spaced spectral components that change frequency as a function of time over a broad range of frequencies.

It is presumed that only one Orca contributed to the sound signal represented by the curves 12, 22, 32a-32c of FIGS. 1, 1A, and 1B, respectively. This presumption is based on characteristics of the three curves 32a-32c of FIG. 1B, which have similar frequency versus time slopes. These three curves 32a-32c also begin concurrently. The likelihood of independent mammals producing the sound represented by the curves 32a-32c, which have concurrent starting times, similar frequency versus time slopes, and are harmonically spaced, is deemed to be very low.

Harmonic components evident in FIG. 1B appear to be naturally produced by the Orca and are not likely the result of signal recording or signal processing artifacts. If harmonic content were introduced in the recording process rather than by the Orca, the harmonic content would likely be a result of clipping a signal. However, clipping tends to generate harmonics at odd multiples of a fundamental component. This is not the case in FIG. 1B. The curves 32a-32c correspond to both even and odd harmonics.

It will be appreciated that a frequency sweep represented by the curves 32a-32c is within a mid frequency band of about 1 kHz to 5 kHz. In discussion below, some characteristics of the frequency sweep represented by the curves 32a-32c are compared with characteristics of an exemplary waveform employing a frequency sweep, which is representative of a waveform that can be used by a conventional mid-frequency active sonar system.

Conventional active sonar systems can employ a variety of transmit waveforms that can be selected based on a desired objective or mission. Exemplary waveforms include, but are not limited to, a single frequency tonal pulse, a linear frequency modulation waveform (LFM), and a Linear-Period Modulated (LPM) waveform (also sometimes referred to as a Hyperbolic Frequency Modulation (HFM) waveform or a Logarithmic Phase Modulation waveform).

The usage of the HFM waveform provides a variety of benefits including mitigating the degradation of the waveform compression generated by correlation processing when receiving a Doppler distorted waveform as an input. As is known, the HFM sound signal optimizes a so-called Frequency-Modulation Law for use on Doppler-affected sound signals that have a large time-bandwidth product. Presuming an instantaneous period to be linear optimizes the Frequency-Modulation Law. Slope and y-intercept parameters govern the HFM waveform as can be seen in equations below. The HFM waveform can be written as:

$$s(t) = A(t)\cos\left[\frac{2\pi}{b}\ln\left(1 + \frac{b}{T_0}t\right)\right] \quad \text{Eq. (1)}$$

$0 \leq t \leq T_0$ $A(t)$ = Amplitude Window Function $T(t) = T_0 + bt$ = Instantaneous Period $b$ = Slope of Instantaneous Period $T_0$ = Y − Intercept of Instantneous Period Referring now to FIG. 2, a graph 40 includes a horizontal axis in units of time in seconds and a vertical scale in units of amplitude. A curve 42 is representative of an exemplary time waveform associated with a sound signal generated by a conventional sonar system. The time waveform 42 has a carrier frequency of approximately 3500 Hz, a time duration of approximately one second, and a bandwidth of approximately 1000 Hz. A time duration of approximately one second and bandwidth of approximately 1000 Hz are chosen for the exemplary conventional waveform 42 based on observations from the spectrogram 30 of FIG. 1B. A center frequency of 3500 Hz is chosen to place the exemplary HFM waveform 42 in the mid frequency band.

At the particular time scale shown, individual cycles of the waveform 42 are not visible. However, a curved amplitude envelope 42a, representative of an exemplary amplitude (or temporal) window (or weighting function), described more fully below, is visible. The time waveform 42 has been normalized to contain a peak amplitude that resides within amplitude bounds of +/−1.0. The time waveform 42 has a frequency modulated (FM) frequency sweep, which is also not visible at the time scale shown. The FM sweep can be a hyperbolic FM (HFM) frequency sweep. As used herein, the term "chirp" is used to describe a signal that changes frequency with time from a start frequency to a stop frequency. The FM time waveform 42 can be generated using either an upward or a downward frequency sweep as a function of time. In this example, an upward frequency sweep characteristic was employed. An upward frequency sweep was chosen for the example HFM waveform to be consistent with the behavior observed in the spectrogram generated from the recording of the Orca transmission.

The exemplary HFM time waveform 42 of FIG. 2 has a temporal amplitude weighting function depicted by the curved envelope function of curve 42a. The temporal window function 42a represents a Gaussian window function employing a value of alpha that is 1.5.

Performance comparisons made below between various man-made waveforms (which were built using identical time-bandwidth products) are based on autocorrelation and ambiguity functions. Some of the performance parameters that are derived from the autocorrelation and ambiguity functions include, but are not limited to:

An expected maximum side lobe interference level in the time (or range) domain

An expected maximum side lobe interference level in the frequency (or Doppler) domain An optimal theoretical range resolution (governed by the half power points) of a waveform correlated with itself under zero Doppler conditions An optimal theoretical Doppler resolution (governed by the half power points) of a resultant waveform generated by taking the Fourier transform of the time waveform correlated with itself under zero Doppler conditions An indication of Doppler tolerance of a waveform as the waveform undergoes Doppler distortions imparted on it by targets having unknown relative radial velocities.

In order to establish meaningful performance comparisons between the various man-made waveforms discussed herein, a single performance parameter can be held to a fixed value, while the remaining performance parameters can be allowed to vary. The performance parameters that are allowed to vary can then be compared for each waveform in order to identify benefits and/or problems associated with a selected waveform when compared to the exemplary HFM waveform 42 of FIG. 2.

The fixed performance parameter used herein is a maximum allowable temporal side lobe interference level relative to the maximum peak associated of a replica correlation (i.e.

a correlation of a waveform with a replica of itself, which can be an autocorrelation when the replica and the waveform are the same). This performance parameter was fixed to the constant level of −28 dB.

The output of a replica correlation process for HFM waveform having a flat envelope (not shown) results in a maximum temporal side lobe interference level of −13 dB relative to the peak of the correlated waveform. In order to establish the maximum temporal side lobe interference level at −28 dB relative to the peak of the correlated waveform, a temporal amplitude weighting function was required, which is represented by the amplitude envelope 42a. A Gaussian window function utilizing an alpha value of 1.5 results in a maximum temporal side lobe interference level of −28 dB relative to the peak of the correlated waveform.

Referring now to FIG. 2A, a graph 50 includes a horizontal axis in units of frequency in Hertz and a vertical scale in units of decibels. A curve 52 is a power spectrum representative of an exemplary conventional HFM sound signal generated by a conventional sonar system in accordance with the time waveform 42 of FIG. 2. This power spectrum was computed by calculating a single Fourier Transform record over the entire duration of the waveform depicted in FIG. 2. The power spectrum curve 52 has been normalized to 0 dB, such that all levels are plotted relative to a maximum power level of 0 dB.

This curve 52 is representative of the above-described time waveform 42 having a hyperbolic FM frequency sweep, a Gaussian amplitude window, a carrier frequency of approximately 3500 Hz, a time duration of approximately one second, and a bandwidth of approximately one thousand Hz.

The transmit time waveform 42 (chirp) of FIG. 2 has favorable transmit properties associated with sonar hardware employed by many conventional active sonar systems. The chirp 42 also has many favorable characteristics relative to sonar receiver signal processing. Unlike a linear FM chirp waveform, the HFM chirp waveform has a power level that is inversely proportional to frequency. However, it will be recognized that the above-described windowing tends to affect the ability to see this frequency dependent power characteristic in the power spectrum 52, when plotted using a decibel scale. The frequency dependent power level, which is apparent in the power spectrum 52, results from both the frequency dependent power characteristic of the HFM waveform as well as the above-described window function.

Referring now to FIG. 2B, a graph 60 includes a horizontal scale in units of frequency and a vertical scale in units of time in seconds. The graph 60 is a spectrogram representative of an exemplary conventional HFM signal generated by a conventional sonar system in accordance with the time waveform 42 of FIG. 2 and to the power spectrum 52 of FIG. 2A. A curve 62 spans a time period of approximately one second. The curve 62 has a frequency that changes with respect to time, becoming higher in frequency as time progresses, and having a frequency sweep rate and a frequency span similar to that of the curves 32a, 32b, 32c of FIG. 1B, which were generated by an Orca.

A third dimension is represented in the graph 60 by an intensity of the curve 62, wherein a darker portion of the curve 62 is representative of a greater sound power.

Background noise was added to the time waveform 42 of FIG. 2 to ensure similar background noise characteristics are present when comparing the Orca waveforms of FIG. 1 to the man-made waveforms described herein. The spectrogram 60 was computed from a sum of the resultant background noise plus HFM waveform signal. The noise background that was added to the man made HFM waveform 42 was obtained by sampling the ocean sounds in the Orca recordings when no Orca transmissions were present.

Like the spectrogram 30 of FIG. 1B, the spectrogram 60 of FIG. 2B was normalized to have a peak power level of 0 dB. A floor of −40 dB was employed to limit the dynamic range of the spectrogram levels to 40 dB. This 40 dB dynamic range was employed to allow a depiction of the spectrogram that could be visually interpreted over a 256-value color map.

The curve 62 is indicative of a narrowband tonal component that sweeps up in frequency as a function of the time over a finite duration pulse length. It can be seen that the curve 62, which is representative of a signal generated by a convention HFM sonar system, has characteristics (e.g., modulation, time duration, bandwidth, center frequency, sweep rate) similar to the curves 32a-32c of FIG. 1B, which are representative of sound generated by an Orca. The similarity provides evidence that supports the above-described hypotheses that naval vessels employing these types of chirp HFM signals can result in beaching of certain marine mammals due to a perception by the marine mammals that killer whales are nearby.

The Orca signal, which is represented by time the time waveform 12 of FIG. 1, by the power spectrum curve 22 of FIG. 1A, and by the spectrogram curves 32a-32c of FIG. 1B and also the conventional sonar HFM signal, which is represented by the time waveform 42 of FIG. 2, by the power spectrum 52 of FIG. 2A, and by the spectrogram curve 62 of FIG. 2B, reside in the mid-frequency band used by conventional sonar systems. As used herein, the mid-frequency band is from about 1 kHz to about 5 kHz. Signals 12, 42 both have generally the same pulse lengths (time durations) of approximately one second. Signals 12 and 42 contain frequency content that resides within the mid frequency band as described above. Also, signals 12 and 42 have tonal components, which sweep upward in frequency over a one kHz bandwidth at a similar rate of about one kHz per second.

Although the Orca sound signal 12 is not identical to the conventional HFM sound signal 42, they may appear similar enough that a marine mammal, which hears the man-made HFM chirp signal 42, may react with a flight response, resulting in a beaching.

Even a simple human auditory evaluation of the conventional HFM sound signal 42, when compared to the Orca generated sound signal 12, demonstrates that the naturally produced Orca sound signal 12 and the man-made HFM chirp 42 sound similar to each other. The similarity in the perception of the sound between these two signals further suggests that marine mammals could misinterpret the man-made HFM chirp signals to be sound generated by an Orca.

From discussion above, it will be understood that the time waveform 42 of FIG. 2 is generated with an upward frequency sweep characteristic. However, FM chirp waveforms used in a conventional active sonar system can be generated with either an upward or downward frequency sweep characteristic. The downward sweep characteristic has been observed to be generated at some times by some killer whales. It is not unreasonable to assume that a downward sweep waveform would elicit the same negative response in some marine mammals.

As described above, particular waveforms are used by active sonar systems based on particular objectives or missions, for example, detection, localization, tracking, or classification of a target. The particular waveform selected for a particular objective or mission has a major impact on the overall system performance. Waveforms used to generate sound signals in a sonar system are characterized by a variety of characteristics that include, but are not limited to a modulation, a pulse duration, a center frequency, a bandwidth, a frequency sweep rate, a temporal amplitude window function, and a signal energy (or peak sound pressure level).

Frequency modulated chirp waveforms having a variety of signal characteristics (e.g. modulation, pulse duration, center frequency, frequency sweep type and rate, bandwidth, amplitude weighting) are used by modem sonar systems in the detection, localization, tracking and classification problem. Because the various performance parameters of the system are inter-related, the waveforms are generated based on practical considerations. It should be understood that, since the performance parameters are inter-related, optimizing a waveform for one particular performance parameter often has undesirable (negative) effects on other performance parameters, so that the selection of a waveform is essentially a trade-off exercise.

Some of the issues considered when selecting a sonar waveform include, but are not limited to, the following considerations:

Can the hardware support a continuous chirp waveform, or is it better suited for short duration transmission of discrete frequency bands?

Can the transmitter support complex waveforms?

Are there bandwidth limitations of the transmitter?

What is the extent of waveform transmission time dictated by the transmitter?

What is the desired maximum detection range for the system?

What level of gain is desired from the matched filter processing?

What is the desired range resolution?

What is the desired Doppler (or relative speed) resolution?

What are the effects of the medium that the designer/operator wishes to mitigate (i.e. waveform distortion due to a dispersive medium)?

Does the operator care more about side lobes levels in Doppler or in range?

Does the operator wish to mitigate the degradation of the pulse compression processing due to Doppler distortions?

As described above, evaluation of the ability of a sound signal to detect a target and to identify a range to a target can be performed using autocorrelation and associated ambiguity functions. Autocorrelation includes correlating a waveform with an identical copy of itself (i.e. a replica). Autocorrelation is the correlation of the waveform with itself and is a more restrictive function of a general cross correlation. The autocorrelation function executed for a waveform provides an optimal theoretical gain provided by a matched filter (i.e., waveform compression) for the waveform in the presence of uncorrelated noise. A comparison of a computed ratio of signal energy to noise energy prior to the correlation processing versus following the correlation processing provides the gain associated with the waveform compression (which is related to the time-bandwidth product). A time delay associated with a location of a peak of an output signal generated by the correlation processing provides a calculated time delay for the received sound signal, which corresponds to a range to the target.

Use of the autocorrelation function provides a measurement of matched filter performance and demonstrates a corresponding theoretical range determination accuracy (localization) that can be obtained with a transmitted sound signal having any signal characteristics, e.g., modulation, time duration, center frequency, bandwidth, and signal energy.

An auto-ambiguity function (or more simply, an ambiguity function) allows the matched filter performance to be studied in two dimensions (time delay and Doppler frequency shift resulting from relative movement between the active sonar system and the target). The ambiguity function can provide an evaluation of an ability of the transmitted sound signal having particular signal characteristics to resolve a target's range as a function of the target's relative radial speed (i.e. Doppler frequency). An ambiguity diagram in the frequency/Doppler dimension it demonstrates an ability of a waveform to identify a target's relative velocity. To this end, an ambiguity function uses as a reference a stored waveform associated with a transmitted sound signal. This stored waveform is the impulse response of the matched filter. The impulse response of the matched filter is convolved with several time-delayed and time distorted versions of the reference signal to produce correlated output waveforms at each relative speed condition.

Detection of targets moving at unknown radial velocities relative to the sonar becomes difficult as a result of distortion (e.g., Doppler shift) of the received waveform. The received waveform becomes distorted as a result of relative motion between the sonar and the target. The relative motion of the target imparts either a compression effect or an elongation effect on the received waveform relative to what was transmitted. Whether the effect is elongation or compression is related to the target's direction relative to the sonar system. The waveform distortion results in a degradation of the matched filter performance, since the received waveform is no longer an ideal match to what was transmitted (ignoring all other effects). This degraded matched filter performance means that the correlation process provides less than the designed signal processing gain, which has a direct effect on the ability of the system to detect a signal in the presence of noise.

Some conventional active sonar systems measure and use an own ship's speed in Doppler nullification processing in an attempt to account for the expected Doppler shift in a sound signal that echoes from a target with relative radial velocity. However, most times the actual relative radial speed of the target is (initially) unknown when both the target and the ship are moving as opposed to the scenario of the moving ship and stationary target. The ambiguity function provides a means by which to compute an ambiguity diagram. The ambiguity diagram provides a means by which a waveform designer can evaluate several performance parameters at the same time in both range (time) and Doppler (frequency) dimensions. As the designer makes changes to the waveform characteristics, resulting performance effects on expected system performance (at the matched filtering stage) can be examined in both dimensions. In this manner, a waveform can be designed that meets performance requirements in one dimension with an acceptable loss of performance in the other dimension.

Many active sonar systems attempt to minimize performance degradation associated with correlation processing that can result from a target having an unknown relative radial speed. One method that can be used to minimize the performance degradation is to choose a transmitted signal that has characteristics that tend to provide a relatively low degree of performance degradation (relative to the correlation processing) in the presence of Doppler distorted received sound signals. Such a transmitted signal is commonly referred to as a "Doppler tolerant waveform." The HFM waveform described above is one such Doppler tolerant waveform.

Another method that can be used to minimize the performance degradation (associated with the matched filter processing) is to use a plurality of Doppler shifted replicas of the stored waveform associated with the transmitted sound signal in a corresponding plurality of parallel matched filters, (e.g., a plurality of parallel cross-correlations), each of which is therefore tuned to a specific Doppler shift (i.e., target relative radial velocity). In this case a Doppler tolerant waveform is not a necessity. The received sound signal is processed in parallel with each one of the plurality of replicas of the transmitted sound signal. By selecting the replica that results in the best correlation output, the target can be detected by a peak in the correlated output, a range to the target can be identified by a time delay of the peak, and also a relative speed can be identified as a result of determining a frequency associated with the replica that produced the best correlator output. However, it will be understood that use of the parallel processing channels requires a substantial increase in receiver processing load.

Lastly, another technique used to that can be used to minimize performance degradation (associated with the matched filter processing) is to utilize a set of multiple waveform types in a transmit sequence. Each waveform type is built to optimize its ability to provide a distinct piece of information. For example, a transmission sequence might utilize four FM transmissions followed by a single frequency tonal waveform transmission. The wide band waveforms (FM) are built with a large time bandwidth product to result in optimal waveform compression and hence optimize the correlator output and detection process in the time/range dimension. The single frequency tonal can have characteristics that optimize the detection process in the Doppler dimension by minimizing the frequency content and thus optimizing the ability to determine the Doppler shift (i.e. relative radial speed) of the target. A feedback mechanism allows the information gained from Doppler transmissions to provide information back to the Doppler nullification processing to optimize the correlation output (i.e. detection processing) by adjusting the replica waveform accordingly. In this case, it will be understood that use of the multiple waveforms requires an increase in receiver processing, an increase in system transmit design, and that for each Doppler transmission/receive cycle a range/bearing information transmission/receive cycle is sacrificed.

Two common waveforms employed by active systems for range/bearing evaluations are linear FM waveforms and hyperbolic FM waveforms. Each signal has its benefits and drawbacks, which are known to those of ordinary skill in the art.

SUMMARY OF THE INVENTION

In accordance with the present invention, a sonar system includes a low probability of marine mammal impact waveform generator adapted to generate a low probability of marine mammal impact (LPMMI) waveform having a modulation component, a time duration component, a bandwidth component, and a center frequency component. The sonar system also includes a sonar transmitter coupled to the waveform generator and adapted to transmit a sound signal into water in accordance with the low probability of marine mammal impact waveform. The modulation component of the LPMMI waveform is selected to reduce a behavioral response from a marine mammal from that which would occur when transmitting another sound signal in accordance with another waveform having approximately the same time duration component, approximately the same bandwidth component, and approximately the same center frequency component as the LPMMI waveform but having a modulation component comprising a frequency modulation. In some embodiments of the sonar system, the LPMMI waveform comprises a low probability of intercept (LPI) waveform having a spread spectrum.

In accordance with another aspect of the present invention, a method of target detection used in a sonar system includes generating a low probability of marine mammal impact (LPMMI) waveform having a modulation component, a time duration component, a bandwidth component, and a center frequency component. The method also includes transmitting a sound signal into water in accordance with the low probability of marine mammal impact waveform. The modulation component of the LPMMI waveform is selected to reduce a behavioral response from a marine mammal from that which would occur when transmitting another sound signal in accordance with another waveform having approximately the same time duration component, approximately the same bandwidth component, and approximately the same center frequency component as the LPMMI waveform but having a modulation component comprising a frequency modulation. In some embodiments of the method, the LPMMI waveform comprises a low probability of intercept (LPI) waveform having a spread spectrum.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
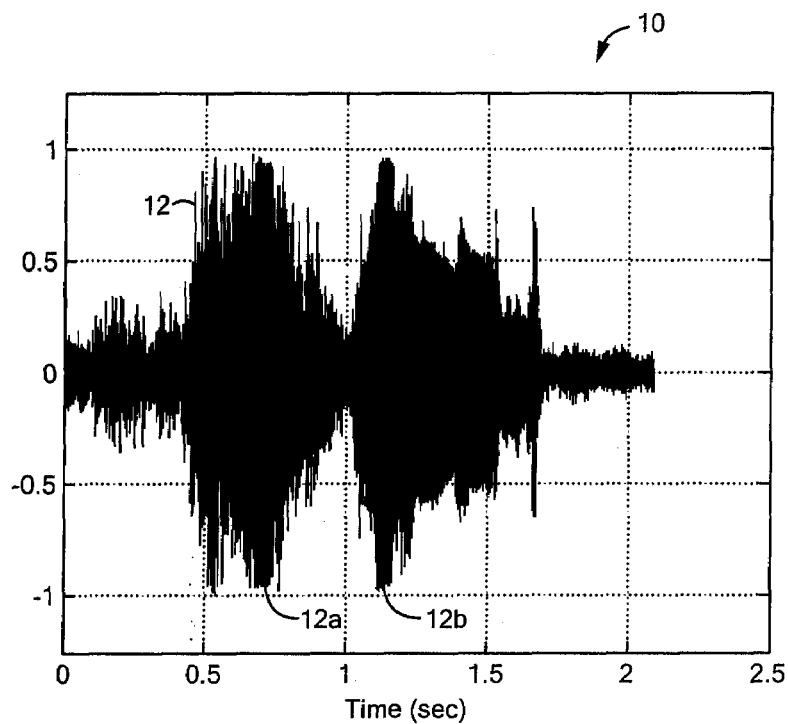
FIG. 1 is a graph showing one example of a time waveform of a sound signal generated by an Orca.
Figure 1A:
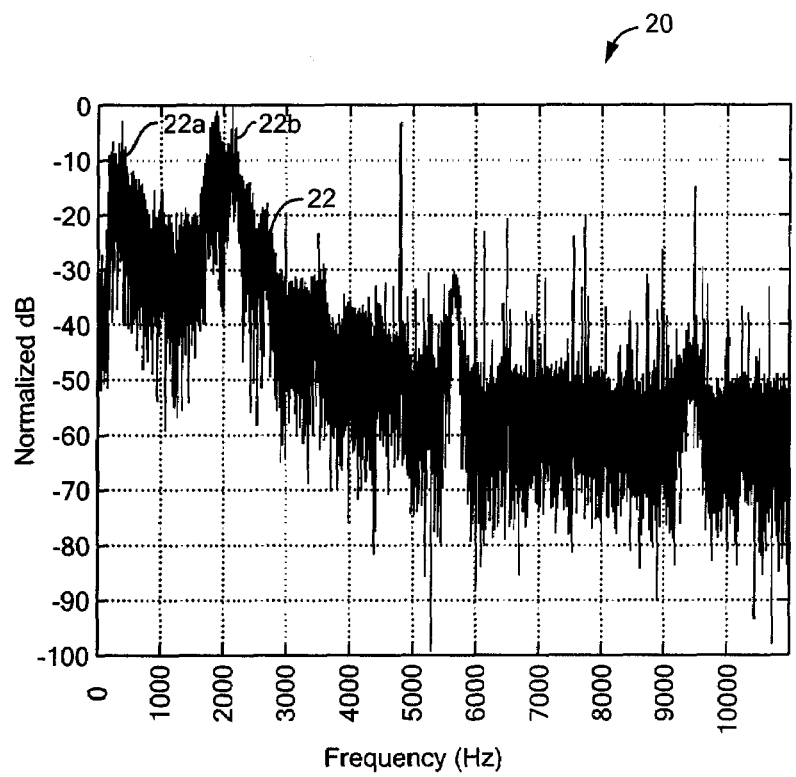
FIG. 1A is a graph showing a power spectrum computed over the duration of the sound signal of FIG. 1 generated by an Orca.

As used herein, the term "sound signal" is used to describe a pressure signal that can propagate in water. As used herein, the term "waveform" is used to describe a signal that can exist in a variety of media. For example, a waveform can be a voltage signal in an electronic circuit. For another example, a waveform can be a sound signal. The waveform and the sound signal can each have signal characteristics, which include, but are not limited to, a time duration (e.g., time duration of a pulse), a bandwidth, a center frequency, a magnitude or intensity, a modulation, and a frequency sweep rate. It will be apparent that an electronic waveform in an electronic circuit having particular signal characteristics can be used to generate an associated sound signal having the same or similar signal characteristics. Therefore, when discussing waveforms herein, it will be appreciated that the same or similar characteristics apply to an electronic signal represented by the waveform and to sound signal represented by the waveform.

The present invention is directed toward waveforms used in an active sonar system that provide target detection, localization, tracking, and/or classification capabilities similar to those of the above-described conventional sonar system using FM waveforms (both linear and hyperbolic) and associated sound signals, while at the same time having signal characteristics that avoid or reduce harm to marine mammals. These waveforms and associated sound signals are referred to herein as "low probability of marine mammal impact" (LPMMI) waveforms and associated sound signals.

As used herein, the term "low probability of intercept" (LPI) waveform and associated sound signal is used to describe a family of waveforms and associated sound signals that are generally difficult to detect by an outside observer not having knowledge of specific characteristics of the LPI signals. A so-called spread spectrum signal is one type of LPI signal. The spread spectrum signal has noise-like characteristics throughout a relatively broad bandwidth. As will become apparent from discussion below, when an LPI sound signal has certain characteristics, it can also be a LPMMI sound signal.

While some particular types of low probability of intercept (LPI) waveforms are described below that provide a low probability of marine mammal impact, other types of LPI waveforms can also be used to provide a low probability of marine mammal impact. Furthermore, while particular examples of waveforms having particular carrier frequencies, bandwidths, time durations, modulations, and/or frequency sweep rates are described below, it should be appreciated that waveforms having other carrier frequencies, bandwidths, time durations, modulations, sweep rates, and/or other characteristics can also be used to provide LPMMI waveforms.

As is known, a so-called M-sequence is a binary state sequence having pseudo random characteristics. An M-sequence can be generated by a shift-register architecture called a maximal period linear binary pseudo-random sequence generator, or more simply, a pseudo-random sequence generator. The shift-register architecture contains M binary cells, each of which has a state, which is either a 0 or 1. In operation, binary vector addition is used to determine a resulting binary number sequence. A pseudo-random sequence generator periodically cycles through a set of $L=2^n-1$ states.

It will be understood that, in an alternate arrangement to the pseudo-random sequence generator, the M-sequence can also be generated from pseudo-random digital values, which are stored in a solid state memory or the like, and which are recalled in sequence.

The M-sequence can be used to generate a phase shift keyed (PSK) waveform and associated sound signal (also referred to herein as a phase encoded signal), for example, a sound signal for which the phase is a first phase value when the M-sequence has a zero state, and a second phase value when the M-sequence has a one state. In some arrangements, the first and second phase values differ by one hundred eighty degrees.

An M-sequence phase encoded signal can be described by the following equation:

$$x(t)=A(t)\cos(2\pi f_c t+m(t)\Theta_L), \qquad \text{Eq. (2)}$$

where:

A(t)=Window Function $f_c$=Carrier Frequency (Hz)

m(t)=Pseudo−Random Code of±1's $\Theta_L$=Phase Shift

While systems and methods are described herein that can employ an LPMMI waveform, in some embodiments, systems and methods can employ a suite (i.e., a plurality) of LPMMI waveforms, which can be different LPMMI waveforms, using techniques that will be apparent. Members of the suite of LPMMI waveforms can have different modulation components, different time duration components, different bandwidth components, and/or different center frequency components. The suite can also include conventional, non-LPMMI, waveforms.

Figure 3:
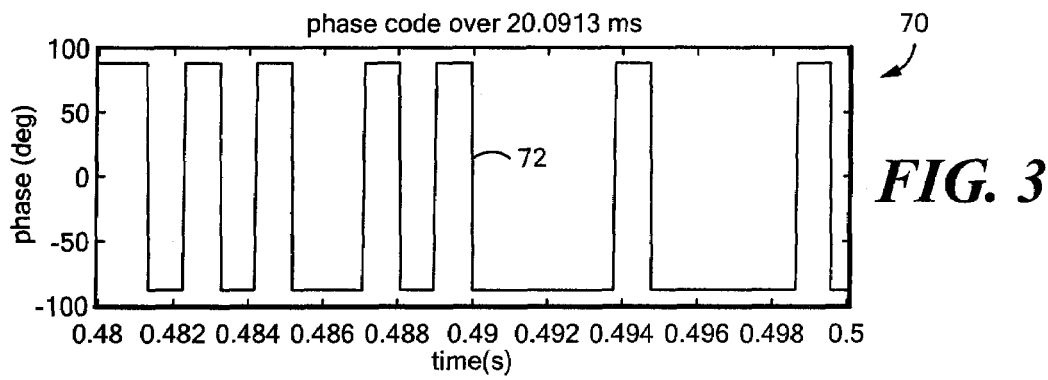
FIG. 3 is a graph showing a portion of a pseudo-random binary state code.

Referring now to FIG. 3, a graph 70 has a horizontal scale in units of time in seconds and a vertical scale in units of phase in degrees. A curve 72 represents at least a part of a pseudo-random digital code having two states, a high and a low state, here indicative of two signal phases, e.g., +90 degrees and −90 degrees, further described below in conjunction with FIG. 3A. The curve 72 may show but a portion of a longer pseudo-random code. As described above, in some embodiments, the length of the code can be determined by a number of shift registers in a shift register pseudo-random code generator. In other embodiments, the length of the code is determined by a count of a number of bits stored in memory as a pseudo-random code.

Figure 3A:
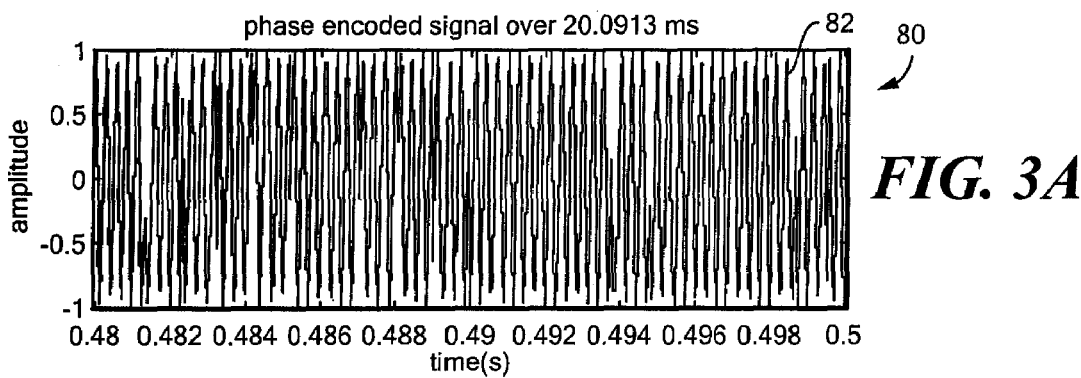
FIG. 3A is a graph showing a time waveform having phase shift keyed (PSK) modulation of a single frequency in accordance with the pseudo-random code of FIG. 3.

Referring now to FIG. 3A, a graph 80 has a horizontal scale in units of time in seconds and a vertical scale in units of amplitude in normalized units. A curve 82 represents a phase shift keyed (PSK) sinusoid waveform that changes phase between +90 degrees and −90 degrees in accordance with the states of the pseudo-random code 72 of FIG. 3. The curve 82 can be indicative of only a portion of a longer PSK waveform that follows a longer pseudo-random code than the curve 72 of FIG. 3. The curve 82 is representative of a waveform and associated sound signal that can be transmitted into water.

In one particular embodiment, an M-sequence phase encoded waveform (e.g., 82) has a carrier (center) frequency of approximately 3500 Hz, a bandwidth of approximately 1000 Hz, and a time duration of approximately 0.9809 seconds. These signal characteristics result in a sound signal having a center frequency, a bandwidth, and a pulse duration similar to those of the natural sound signals produced by the Orca described above in conjunction with FIGS. 1-1B. These signal characteristics also result in a sound signal having a time-bandwidth product similar to that of the conventional HFM waveform 42 discussed above in conjunction with FIGS. 2-2B.

Other M-sequences, or combinations of M-sequences, can be used to generate alternate spread spectrum waveforms having different durations, bandwidths, and center frequencies. A useful range of signal bandwidths is about 2500 to 6000. A useful range of waveform bandwidths is about 500 to 2500 Hz. A useful range of time durations is about 10 msec to 1.5 sec.

It can be shown that the phase encoded waveform 82 achieves optimal waveform compression when left unwindowed (i.e. no temporal amplitude windowing is applied). Therefore, the M-sequence phase encoded waveform 82 can be left unwindowed (i.e. having a boxcar envelope). With this arrangement, the maximum side lobe interference level obtained within the autocorrelation function is −29 dB.

Phase-encoded M-sequence signals obtain optimal performance when unwindowed (i.e., when they have a flat amplitude window). A resulting temporal side lobe interference level obtained by subjecting the M-sequence phase encoded spread spectrum waveform to replica correlation is that which is used as a fixed performance parameter for the temporal side lobe interference level for all of the man made waveforms discussed herein.

A resultant waveform (not shown) generated by performing an autocorrelation function upon the waveform 82 results in a correlation peak having half power points about the peak that are separated by 0.749 ms, which translates to a range resolution of 0.562 meters using a sound velocity of 1500 m/sec.

Figure 2:
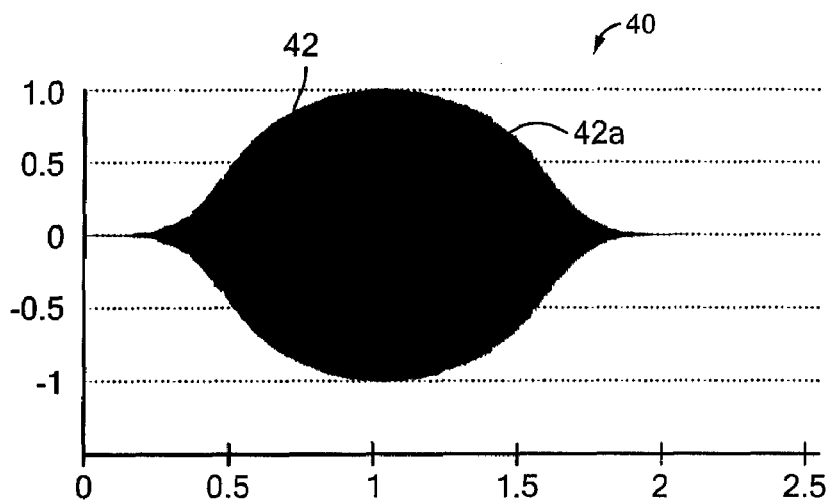
FIG. 2 is a graph showing and exemplary hyperbolic frequency modulated (HFM) waveform plotted as a function of time, which is but one example of a waveform that can be generated by a conventional sonar system.
Figure 2A:
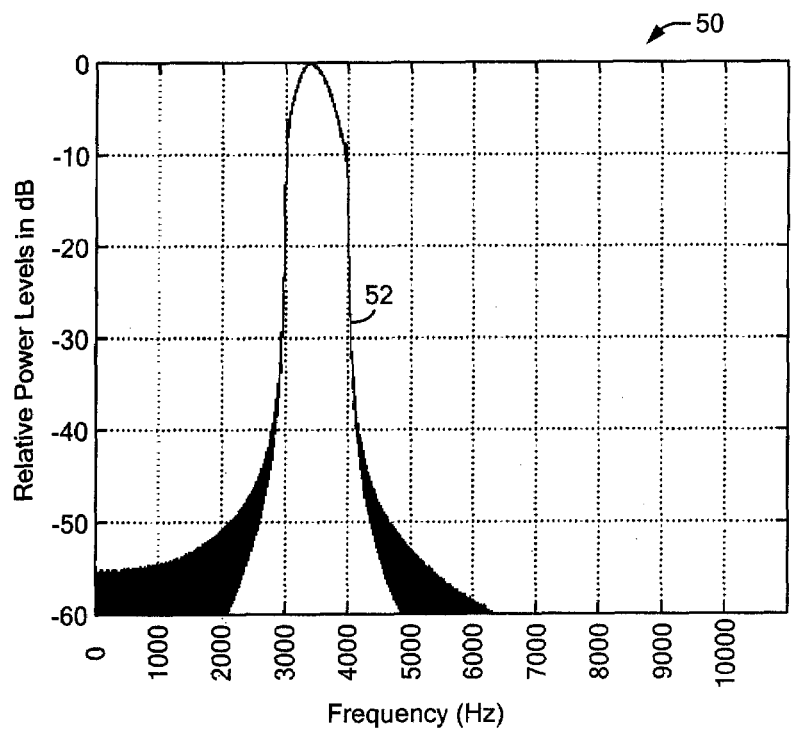
FIG. 2A is a graph showing a power spectrum computed over the entire duration of the hyperbolic frequency modulated (HFM) waveform of FIG. 2.

The exemplary HFM waveform 42 of FIG. 2, having an identical time-bandwidth product and essentially the same temporal side lobe interference level (in its autocorrelation) was also evaluated. A resulting curve (not shown) generated by performing an autocorrelation function upon the waveform 42 results in a correlation peak having half power points about the peak that are separated by 1.237 seconds. This translates to 0.928 meters using a sound velocity of 1500 m/sec. Therefore, the waveform 82 provides a theoretical range resolution (as defined by the half power points or −3dB points) of 0.562 meters compared with the above-described 0.928 meters for the conventional windowed HFM waveform 42 of FIG. 2.

Figure 3B:
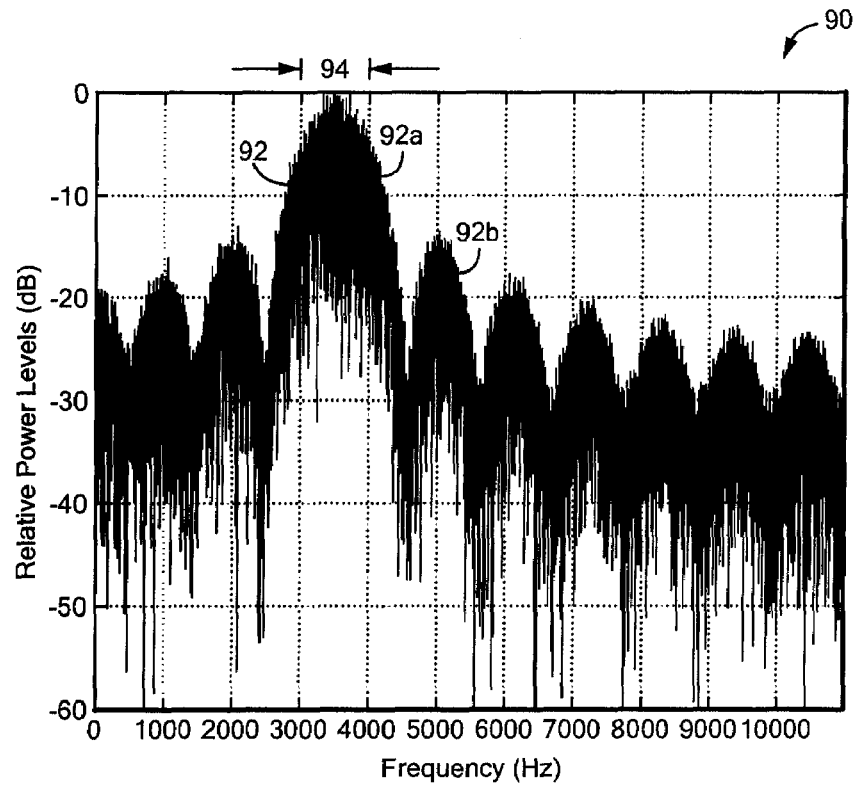
FIG. 3B is a graph showing a power spectrum computed over the duration of the PSK modulated time waveform of FIG. 3A.

Referring now to FIG. 3B, a graph 90 includes a horizontal axis in units of frequency in Hz and a vertical scale in units of decibels. A curve 92 is a power spectrum of a sound signal that can be generated by a sonar system in accordance with the PSK sound signal 82 of FIG. 3A. The power spectrum curve 92 has been normalized to 0 dB, such that all levels are plotted relative to a maximum power level of 0 dB.

This curve 92 is representative of the above-described PSK time waveform 82 having pseudo-random phase shifts, a carrier frequency of approximately 3500 Hz, a time duration of approximately one second, and a bandwidth of approximately one thousand Hz.

The curve 92 has a main lobe 92a, and a plurality of side lobes, of which side lobe 92b is but one example. One of ordinary skill in the art will understand that the lobed structure of the curve 92 is an outcome of the pseudo-random code waveform 82 of FIG. 3A. It will be understood that a width 94 of the main lobe 92a is associated with a bit rate of the pseudo-random code 72 of FIG. 3. Therefore, the main lobe 92a can have a width 94 selected in accordance with a desired time-bandwidth product. One of ordinary skill in the art will understand that a time-bandwidth product is related to a detection performance of a sonar system. Here, the time-bandwidth product is approximately 1000 for a one second pulse duration.

The PSK time waveform 80 of FIG. 3 is referred to as a spread spectrum waveform based on the characteristic that the resultant wide band spectrum 92 is achieved by spreading a narrowband spectral component (which is a single frequency tonal having two phase at the desired carrier frequency) over the spectrum 80 via means of phase modulation.

Figure 3C:
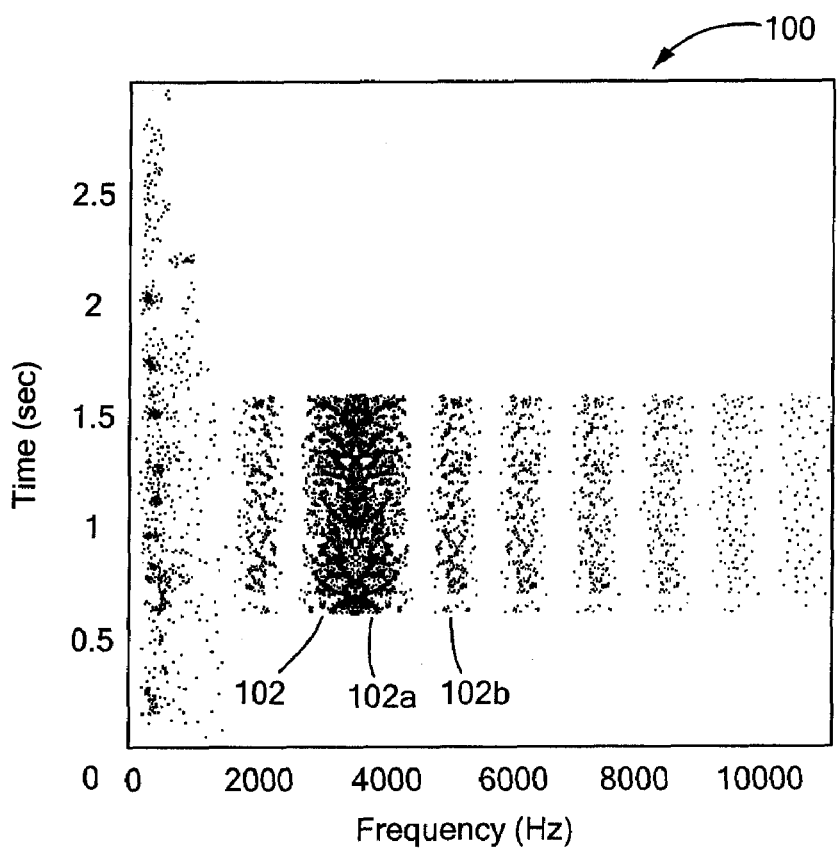
FIG. 3C is a graph showing a spectrogram computed over the duration of the PSK modulated time waveform of FIG. 3A.

Referring now to FIG. 3C a graph 100 includes a horizontal scale in units of frequency and a vertical scale in units of time in seconds. The graph 100 is a spectrogram representative of a sound signal that can be generated by a sonar system in accordance with the PSK waveform 82 of FIG. 3A. Spectrogram features 102 of the spectrogram 100 spans a time period of approximately one second and corresponds to the time waveform 82 of FIG. 3A and to the power spectrum 92 of FIG. 3B.

The features 102 include a dominant feature 102a, which corresponds to the main lobe 92a of the power spectrum curve 92 of FIG. 3B, and also minor features, of which minor feature 102b is but one example. The minor feature 102b correspond to the side lobe 92b of FIG. 3B.

Figure 1B:
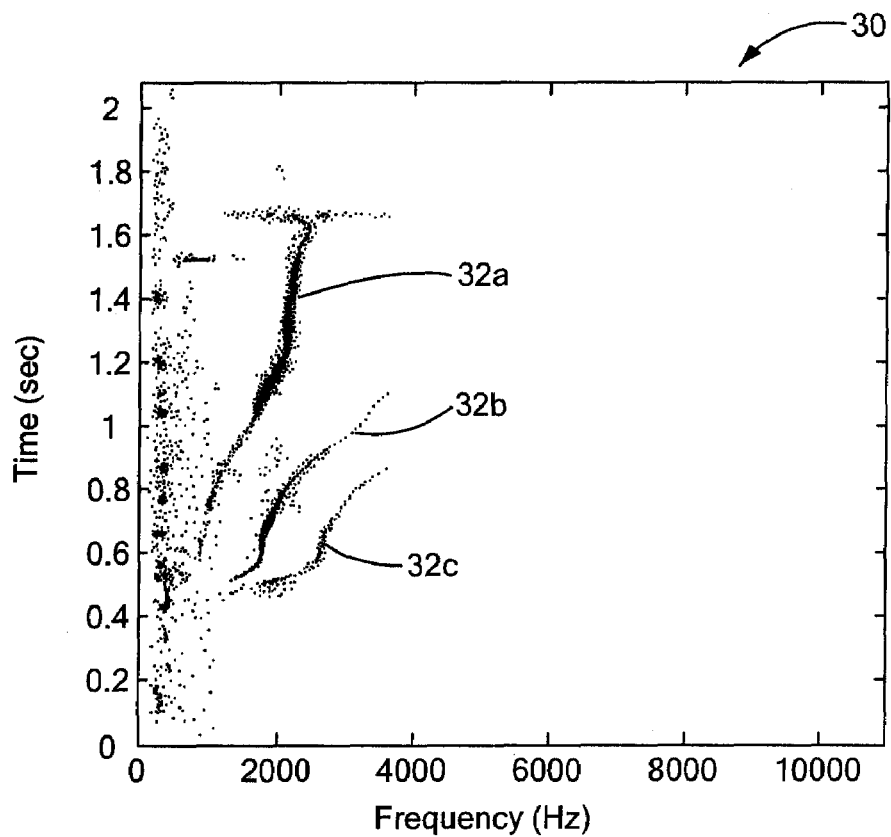
FIG. 1B is a graph showing a spectrogram computed over the duration of the sound signal of FIG. 1 generated by an Orca.
Figure 2B:
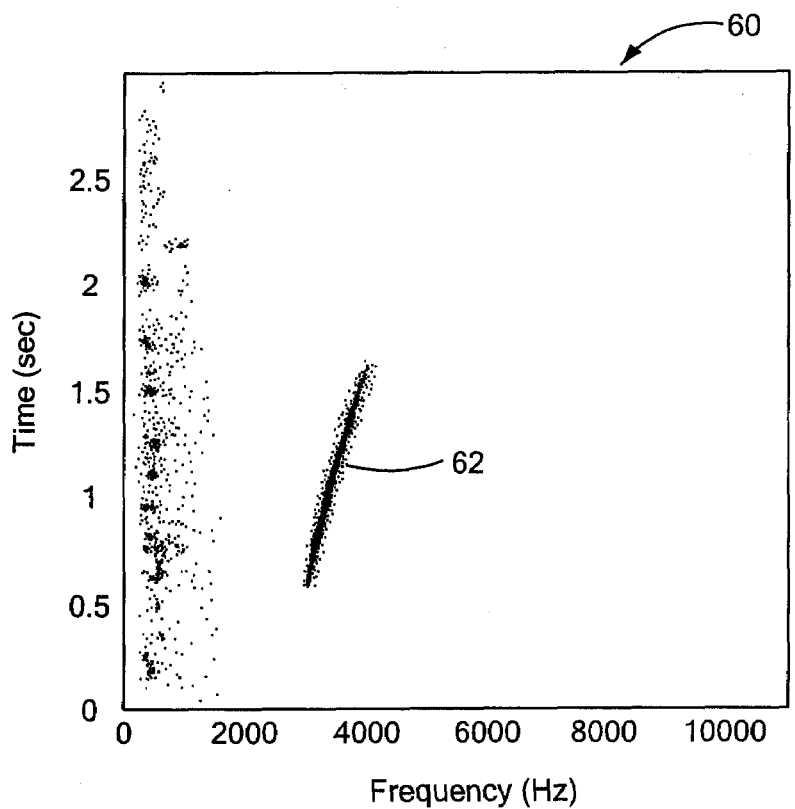
FIG. 2B is a graph showing a spectrogram computed over the entire duration of the hyperbolic frequency modulated (HFM) waveform of FIG. 2.

The dominant feature 102a has a frequency span of about 1 kHz in accordance with the main lobe 92a of FIG. 3B, similar to that of the curves 32a, 32b, 32c of FIG. 1B, which were generated by an Orca, and similar to the curve 62 of FIG. 2B, which is representative of sound generated by a convention HFM sonar system. Background noise was added to the time waveform 82 (a piece of which is depicted in FIG. 3A) to ensure similar background characteristics are present when comparing the Orca waveforms to the man-made waveforms. The spectrogram 100 was computed from the resultant sum of the background noise plus the PSK waveform 82 (FIG. 3A). The noise background that was added to the man made PSK waveform was obtained by sampling the ocean sounds in the Orca recordings when no Orca transmissions were present.

Unlike either the natural sound signal 12 (FIG. 1) produced by the Orca or the man-made FM chirp signal 42 (FIG. 2) described above, the spectrogram 100 of the pseudo-random PSK sound signal 82 plus noise does not have a narrow band tonal component containing all of the waveform energy at any given time that sweeps in frequency as a function of time. Instead the PSK sound signal 82 has a relatively stationary wide frequency spectrum. In the case of the sound signal 82, it can be seen that the waveform energy is spread across the spectrum for the entire duration of the transmission so that they energy at any one frequency at any given time is much lower that the waveform energy at any one frequency at any given time that is associated with the narrowband swept waveforms, (e.g., 42, FIG. 2).

The spectrogram 100 for the M-sequence phase encoded waveform is significantly different than the spectrogram 30 (FIG. 1B) of the natural Orca sound signal and spectrogram 60 (FIG. 2B) of the HFM sound signal even though all of the associated time waveforms and associated sound signals have similar bandwidths, center frequencies, and time durations.

To a human observer, a spread spectrum sound signal generated in accordance with the spectrogram 100 of FIG. 3A sounds substantially different than a sound generated by an Orca, which is represented by the spectrogram 30 of FIG. 1B, or sound generated by an HFM sonar system, which is represented by the spectrogram 60 of FIG. 2B. In general terms, to the human observer, the spread spectrum sound signal sounds like a brief hiss, while the other signals sound like a bird chirp. Marine mammals will, therefore, not perceive the spread spectrum sound signal to be generated by a killer whale.

A spread-spectrum waveform the same as or similar to the M-sequence phase encoded waveform 82 of FIG. 3A can be used to generate a sound signal in an active sonar system. The resulting sound signal can have characteristics the same as or similar to the above-described conventional HFM sound signal 42 of FIG. 2, for example, the same time duration (approximately one second), center frequency (approximately 3500 Hz), bandwidth (approximately 1 kHz), and source level (approximately 220 dB re 1 μPa at 1 meter).

A variety of factors are indicative of a theoretical performance of any sonar system. The factors associated with the signal processing which help determine the performance of the detection processing portion of the sonar system include, but are not limited to, a time-bandwidth product of a transmitted sound signal, a peak to side lobe level of a replica correlation of the sound signal, a center frequency, bandwidth, and time duration of the sound signal.

The actual performance of a sonar system under real ocean conditions is further influenced by a variety of additional factors associated with system hardware, other stages of the signal processing, as well as environmental factors. Some additional environmental factors include, but are not limited to, a degradation in performance in the presence of reverberation, the presence of multi-path received echoes, and the presence of a relative velocity between the sonar system and a target. The affect of a relative velocity is discussed above in conjunction with FIG. 2. The additional environmental factors can also include an affect from sound absorption in water as a function of frequency. An example of an additional hardware factor can include an accuracy with which an amplifier and sound transducer (within a transmit portion) is able to transmit a sound signal, which accurately represents a desired waveform. For example, it is known that a sound transducer has mechanical characteristics, which impart a bandwidth filter on a generated. Hence a transmitted sound signal will have distortion resulting from the mechanical characteristics.

A sonar system that uses PSK spread spectrum sound signals can theoretically have substantially the same detection, localization, tracking, and classification capabilities as the same system employing the use of conventional HFM waveforms. However, the PSK spread spectrum sound signal should not cause marine mammals to beach themselves. Therefore, the PSK spread spectrum sound signal is a useful LPMMI sound signal.

Figure 4:
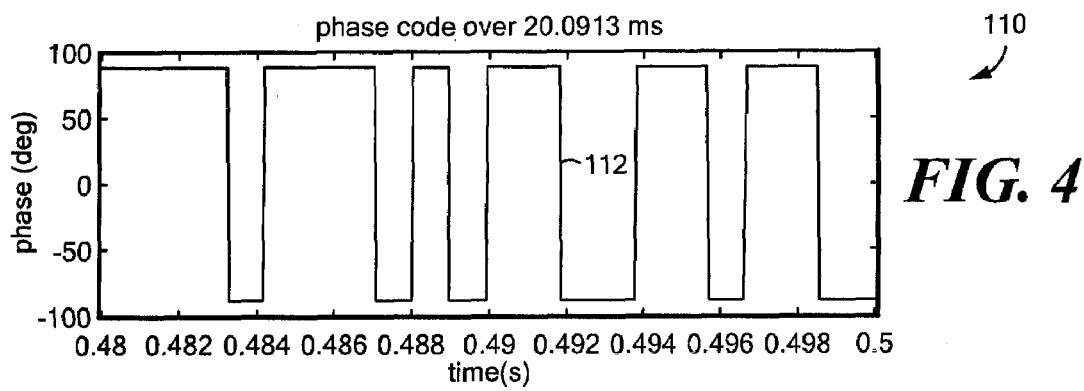
FIG. 4 is a graph showing a portion of a pseudo-random binary state code generated by a genetic algorithm.

Referring now to FIG. 4, a graph 110 has a horizontal scale in units of time in seconds and a vertical scale in units of phase in degrees. A curve 112 represents at least a part of an exemplary digital code generated in accordance with a genetic algorithm and having two states, a high and a low state, here indicative of two signal phases, +90 degrees and −90 degrees, which are further described below in conjunction with FIG. 4A. The curve 112 may show but a portion of a longer digital code. In some embodiments, the length of the code can be determined by an electronic code generator. In other embodiments, the length of the code is determined by a count of a number of bits stored in a memory as a genetic code.

Genetic algorithms are stochastic optimization methods that mimic the behavior of natural biological evolution. Genetic algorithms use the principle of survival of the fittest specimen (code) to determine a population of potential solutions (codes) in order to generate an optimized solution (code). Selecting individuals according to their level of fitness and breeding them together (combining them) creates a new set of approximations at each generation. The evolution of this process leads to populations of individuals (code) that are more adapted to their environment (more optimized) than the individuals that they were created from.

The genetic algorithm can be directed at optimization or improvement of a variety of characteristics. In the case of a sonar system and optimizing detector performance thereof, the genetic algorithm can be used to generate the exemplary genetic code 112. In some embodiments, a genetic algorithm generated code can optimize a peak to sidelobe level of an output of an autocorrelation function. However, in some embodiments, the genetic algorithm can optimize or improve other characteristics, including but not limited to, a width of a peak of an output of autocorrelation function, a probability of detection of a sonar system, a false alarm rate of a sonar system, a localization accuracy of a sonar system, a tracking accuracy of a sonar system, a classification accuracy of a sonar system, or an acoustic output power of a sonar system in detection, localization, tracking, or classification modes of operation.

The genetic algorithm can be used to derive optimal specimens given a set of input conditions and a desired performance parameter by which to judge the specimens produced by the algorithm. Genetic algorithms are very useful over a broad range of problems. The genetic algorithm is used in examples herein to generate binary state phase codes (e.g., containing a number sequence of ±1's), which can be used to replace the M-sequence generated phase code described above in conjunction with FIG. 3. It will become apparent from discussion below, that PSK waveforms using the genetic algorithm generated code demonstrate the same desired performance. While genetic algorithms are described herein to generated binary codes, in some alternate arrangements, genetic algorithms are used to generate optimal phase codes (which are used to generate spread spectrum waveforms) where the phase codes contain three or more states (e.g., resulting in three or more phases in a PSK waveform).

Figure 4A:
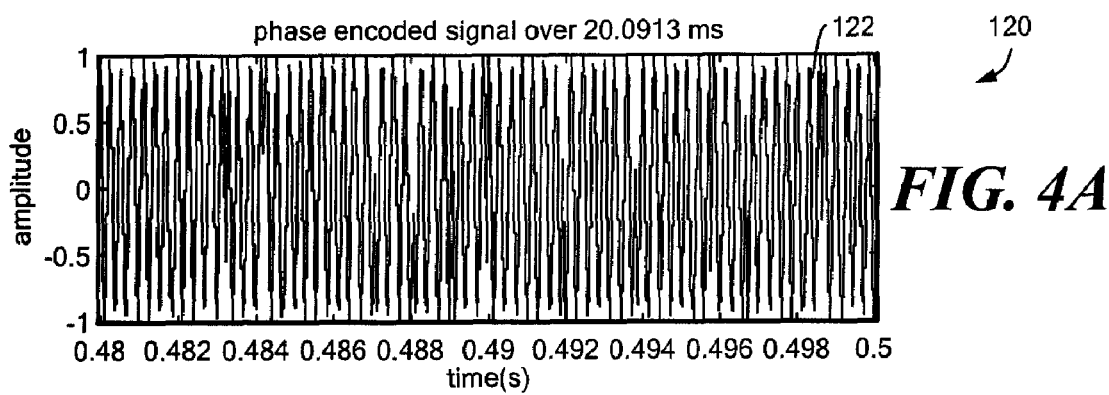
FIG. 4A is a graph showing a single frequency time waveform having phase shift keyed (PSK) modulation in accordance with the genetic algorithm code of FIG. 4, forming a genetic algorithm phase encoded signal.

Referring now to FIG. 4A, a graph 120 has a horizontal scale in units of time in seconds and a vertical scale in units of amplitude in normalized units. A curve 122 represents a phase shift keyed (PSK) sinusoid waveform that changes phase between +90 degrees and −90 degrees in accordance with the states of the digital code 112 of FIG. 4. The curve 122 can be indicative of only a portion of a longer PSK waveform that follows a longer genetic code than the curve 112 of FIG. 4. The curve 122 is representative of a sound signal that can be transmitted into water. The curve 122 does not have amplitude weighting, as was used in the generation of the HFM waveform 42 described above in conjunction with FIG. 2.

In one particular embodiment, the spread spectrum waveform employing the phase code derived by the genetic algorithm (e.g., 112) (also referred to herein as a genetic algorithm phase encoded signal) has a carrier (center) frequency of approximately 3500 Hz, a bandwidth of approximately 1000 Hz, and a time duration of approximately 0.9809 seconds. These signal characteristics result in a signal having a center frequency, a bandwidth, and a pulse duration similar to those of the natural sound signals produced by the Orca that are presented above in conjunction with FIGS. 1-1B. These signal characteristics also result in a signal having a time-bandwidth product similar to that of the conventional HFM signal discussed above in conjunction with FIGS. 2-2B.

Other codes generated by a genetic algorithm or combinations of such codes can be used to generate alternate spread spectrum waveforms having different durations, bandwidths, and center frequencies. A useful range of signal bandwidths is about 2500 to 6000. A useful range of waveform bandwidths is about 500 to 2500 Hz. A useful range of time durations is about 10 msec to 1.5 sec.

As discussed above, phase code sequences having signal characteristics other than a binary state can also be used in the generation of spread spectrum waveforms. The genetic algorithm can provide optimal non-binary state phase codes.

A resulting output (not shown) generated by performing an autocorrelation upon the waveform 122 has a theoretical correlation width (governed by the half power points about the peak) of 0.763 ms, which translates to a range resolution of 0.573 meters using a sound velocity of 1500 m/sec. As described above in conjunction with FIGS. 2 and 3, the waveform 122 can be generated in accordance with a fixed performance parameter associated with the maximum temporal side lobe interference level in the correlated waveform of −28 dB, so that the performance parameters of this waveform can be compared to the performance parameters of the exemplary HFM waveform 42 of FIG. 2 and to the spread spectrum waveform 82 of FIG. 3A, which is generated using the M-sequence phase code 72 of FIG. 3. The waveform 122 provides a theoretical range resolution of 0.763 meters compared with the above-described 0.928 meters for the conventional windowed HFM waveform 42 of FIG. 2 for the same relative temporal side lobe interference level.

Figure 4B:
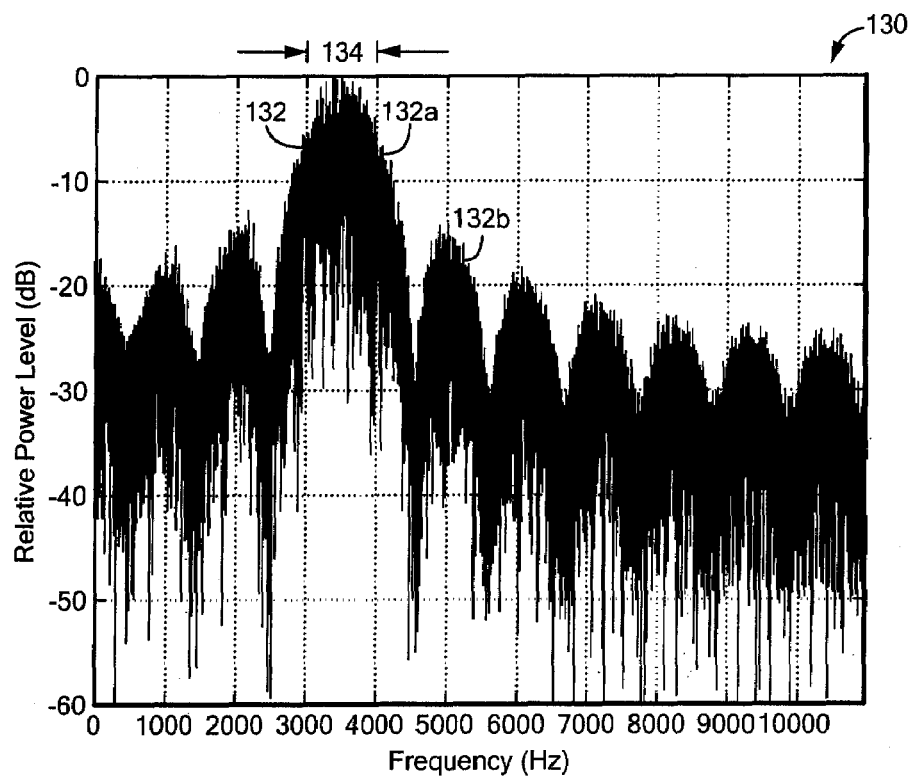
FIG. 4B is a graph showing a power spectrum computed over the duration of the PSK modulated time waveform of FIG. 4A.

Referring now to FIG. 4B, a graph 130 includes a horizontal axis in units of frequency in Hz and a vertical scale in units of decibels. A curve 132 is a power spectrum of a sound signal that can be generated by a sonar system in accordance with the PSK time waveform 122 of FIG. 4A. The power spectrum curve 132 has been normalized to 0 dB, such that all levels are plotted relative to a maximum power level of 0 dB.

This curve 132 is representative of the above-described PSK time waveform 122 of FIG. 4A having phase shifts in accordance with a phase code 112 of FIG. 4 derived by the genetic algorithm which has a carrier frequency of approximately 3500 Hz, a time duration of approximately one second, and a bandwidth of approximately one thousand Hz.

The curve 132 has a main lobe 132a, and a plurality of side lobes, of which side lobe 132b is but one example. One of ordinary skill in the art will understand that the lobed structure of the curve 132 is an outcome of the genetically encoded waveform 122 of FIG. 4A. It will be understood that a width 134 of the main lobe 132a is associated with a bit rate of the genetic code 112 of FIG. 4. Therefore, the main lobe 132a can have a width 134 selected in accordance with a desired time-bandwidth product. One of ordinary skill in the art will understand that a time-bandwidth product is related to a detection capability of a signal in noise. Here, the time-bandwidth product is approximately 1000 for a one second pulse duration.

The PSK time waveform 122 of FIG. 4A is referred to as a spread spectrum waveform based on the fact that the resultant wide band spectrum 132 is achieved by spreading a narrowband spectral component (which is a single frequency tonal having two phases at the desired carrier frequency) over the spectrum 130 via means of phase modulation.

Figure 4C:
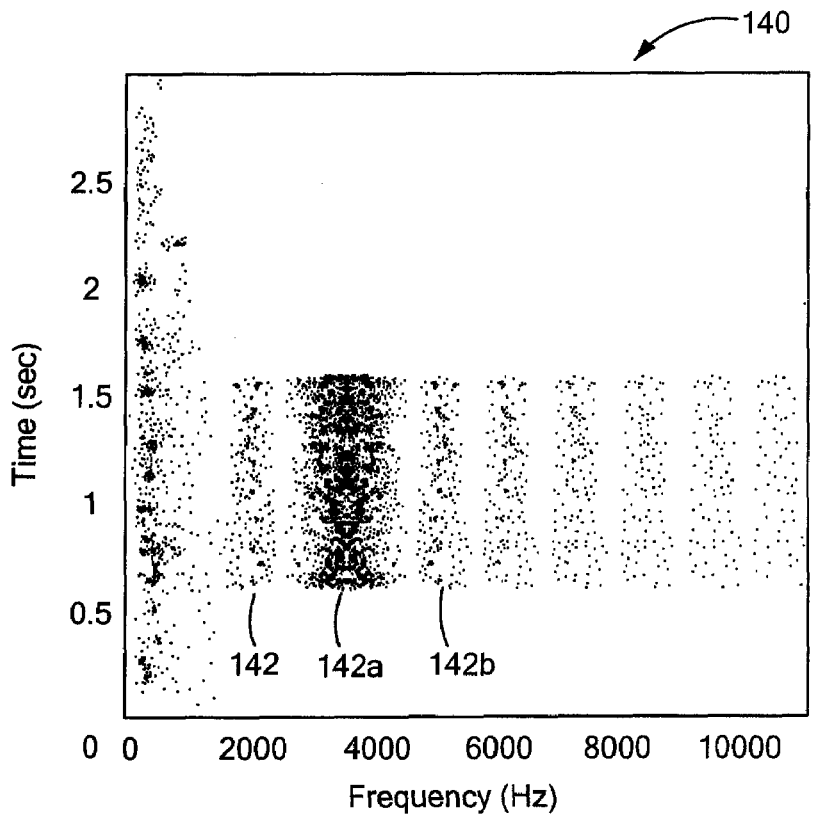
FIG. 4C is a graph showing a spectrogram computed over the duration of the PSK modulated time waveform of FIG. 4A.

Referring now to FIG. 4C, a graph 140 includes a horizontal scale in units of frequency and a vertical scale in units of time in seconds. The graph 140 is a spectrogram representative of a sound signal that can be generated by a sonar system in accordance with the PSK waveform 122 of FIG. 4A. Spectrogram features 142 of the spectrogram 140 spans a time period of approximately one second and corresponds to the time waveform 122 of FIG. 4A and to the power spectrum 132 of FIG. 4B.

The features 142 include a dominant feature 142a, which corresponds to the main lobe 132a of the power spectrum curve 132 of FIG. 4B, and also minor features, of which minor feature 142b is but one example. The minor feature 142b corresponds to the side lobe 132b of FIG. 4B.

The dominant feature 142a has a frequency span of about 1 kHz in accordance with the main lobe 132a of FIG. 4B, similar to that of the curves 32a, 32b, 32c of FIG. 2B, which were generated by an Orca, and similar to the curve 62 of FIG. 2B, which is representative of sound generated by a convention HFM sonar system. Background noise was added to the time waveform 122 of FIG. 4A (a portion of which is shown in FIG. 4A) to ensure similar background characteristics are present when comparing Orca waveforms to the man-made waveforms. The spectrogram 140 was computed from a sum of the resultant background noise plus PSK waveform. The noise background that was added to the man made PSK waveform was obtained by sampling the ocean sounds in the Orca recordings when no Orca transmissions were present.

Unlike either the natural sound signal produced by the Orca or the man-made FM chirp signals described above, the spectrogram 140 of the PSK sound signal 122 plus noise does not have a narrow band tonal component containing all of the waveform energy at any given time that sweeps in frequency as a function of time. Instead the PSK sound signal 122 has a relatively stationary wide frequency spectrum as a function of time. In the case of the sound signal 122, the waveform energy is spread across the spectrum for the entire duration of the transmission so that they energy at any one frequency at any given time is much lower that the waveform energy at any one frequency at any given time that is associated with the narrowband swept waveforms.

The spectrogram 140 for the genetic algorithm phase encoded waveform 122 is significantly different than the spectrogram 30 (FIG. 1B) of the natural Orca sound signal and spectrogram 60 (FIG. 2B) of the HFM sound signal even though all of the waveforms have similar bandwidths and time durations.

Like the pseudo random signal described above in conjunction with FIGS. 3-3C, to a human observer, a sound signal generated in accordance with the spectrogram 142 of FIG. 4C sounds substantially different than a sound generated by an Orca, which is represented by the spectrogram 30 of FIG. 1B, or sound generated by an HFM sonar, which is represented by the spectrogram 60 of FIG. 2B. In general terms, to the human observer, the sound signal sounds like a brief hiss, while the signals associated with the Orca and the traditional HFM waveform sound like a bird chirp. Marine mammals will, therefore, not perceive the spread spectrum genetically encoded sound signal to be generated by a killer whale.

A spread-spectrum waveform the same as or similar to the genetic algorithm phase encoded waveform 122 can be used to generate a sound signal in an active sonar system. The resulting sound signal can have characteristics the same as or similar to the above-described conventional HFM sound signal, for example, the same time duration (approximately one second), center frequency (approximately 3500 Hz), bandwidth (approximately 1 kHz), and source level (approximately 220 dB re 1 µPa at 1 meter).

As described above in conjunction with FIG. 3C, a variety of factors are indicative of a theoretical performance of any sonar system. The factors associated with the signal processing which help determine the performance of the detection processing portion of the sonar system include, but are not limited to, a time-bandwidth product of a transmitted sound signal, peak to side lobe level of the autocorrelation of the sound signal, the center frequency, bandwidth, and time duration of the sound signal.

An active sonar system employing a spread spectrum waveform (built by using a phase code generated by a genetic algorithm) which has an identical time-bandwidth product to a traditionally HFM waveform could theoretically achieve similar detection, localization, tracking, and classification capabilities as the same system employing the traditional HFM waveform. However, the genetically encoded PSK spread spectrum sound signal should not cause marine mammals to beach themselves. Therefore, the genetically encoded PSK spread spectrum sound signal is an LPMMI sound signal.

Figure 5:
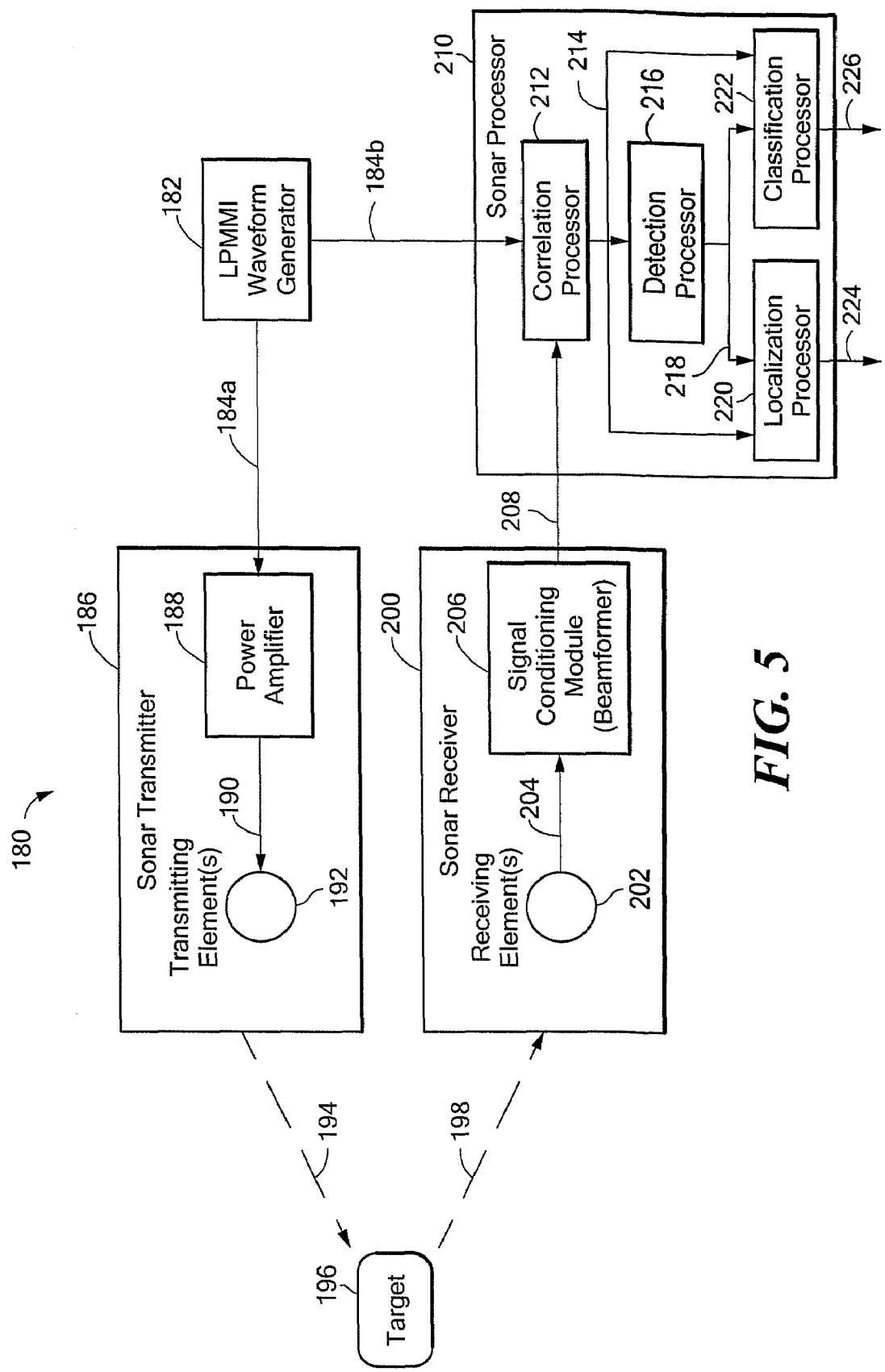
FIG. 5 is a block diagram of a sonar system having a low probability of marine impact (LPMMI) waveform generator.

Referring now to FIG. 5, a sonar system 180 includes a low probability of marine mammal impact (LPMMI) waveform generator 182 adapted to generate an LPMMI waveform 184a and a replica 184b of the LPMMI waveform 184a. The LPMMI waveform 184a can be a low probability of intercept waveform having a spread spectrum. The LPMMI waveform 184a can be, but is not limited to:

An M-sequence pseudo random phase encoded signal
A binary state genetic algorithm phase encoded signal.
A spread spectrum waveform generated by means of modulation with a phase code having more than two states. This phase code is generated by a genetic algorithm.
A spread spectrum waveform generated by means of modulation with a phase code using Barker codes.
A spread spectrum waveform generated by means of modulation with a phase code using Gold codes.
A spread spectrum waveform generated by means of modulation with a phase code using Welti codes.

In one particular embodiment, the LPMMI waveform 184a can have a carrier (center) frequency of about 3500 Hertz, a bandwidth of about 1000 Hertz, and a time duration of about one second in order to emulate some characteristics of conventional HFM sound signal 42 of FIG. 2 used in some forms of conventional sonar systems. However, the LPMMI waveform 84a can have a carrier (center) frequency in the range of 2500 to 6000 Hertz, a bandwidth in the range of 500 to 2500 Hertz, and a time duration in the range of 10 msec to 1.5 sec.

The sonar system 180 also includes a sonar transmitter 186 adapted to receive the LPMMI waveform 184a and to transmit a sound signal 194 into water in accordance with the LPMMI waveform 184a. The sonar transmitter 186 can include a power amplifier 188 coupled to receive the LPMMI waveform 184a. The power amplifier 188 is coupled to one or more transmitting elements 192, which are adapted to generate the sound signal 194. In some embodiments, the transmitting elements 192 are arranged in a transmitting sonar array (not shown), and the sound signal 194 is a beamformed sound signal. In some arrangements, there is a separate power amplifier associated with each one of, or with groups of the transmitting elements 192.

The sonar system 180 also includes a sonar receiver 200 adapted to receive a sound signal 198 associated with the transmitted sound signal 194 and to generate a conditioned signal 208 in accordance with the received sound signal 198. The received sound signal 198 may be generated by an echo of the transmitted sound signal 194 from a target 196.

The sonar receiver 200 can include one or more receiving elements 202 adapted to receive the sound signal 198. In some embodiments, the receiving elements 202 are arranged in a receiving sonar array (not shown), which can be the same as the transmitting sonar array or different from the transmitting sonar array. The receiving elements 202 can be coupled to a provide and electronic signal 204 representative of the sound signal 198 to a signal conditioning module 206 adapted to provide a variety of functions, which can include, but which are not limited to, amplification, time varying gain, carrier demodulation, bandpass filtering, and beamforming, and adapted to generate a conditioned signal 208 in conjunction therewith.

The sonar system 180 can also include a sonar processor 210 adapted to process the conditioned signal 208. The sonar processor 210 can include a correlation processor 212, coupled to receive the conditioned waveform 208. The correlation processor 212 is adapted to provide a correlation signal 214, which can be coupled to a detection processor 216. The sonar processor 210 can also include a localization processor 220 coupled to the detection processor 216 and to the correlation processor 212. The sonar processor 210 can also include a classification processor 222 coupled to the detection processor 220 and to the correlation processor 212. In some embodiments, one or more of the processors 216, 220, 222 can be omitted.

The correlation processor 212 is adapted to correlate the received waveform 208 with one or more versions 184b the of LPMMI waveform 184a. In some embodiments, the one or more versions 184b of the LPMMI waveform 184a can represent a plurality of anticipated Doppler shifts of the received sound signal 198, in accordance with a relative movement between the sonar system 180 and the target 196. The correlation processor 212 provides a correlated waveform 214 accordingly.

The detection processor 216 is adapted to detect the target 196 from the correlated waveform 214 using estimates of signal energy versus noise energy derived from the correlated waveform 214 as a function of time and using thresholds based on pre-established noise models and a constant false alarm rate (CFAR) criteria. A detection signal 218 is provided, which is indicative of a detection of the target 196. The localization processor 220 is adapted to receive the detection signal 218 and also the correlated waveform 214 and to provide a localization signal 224 accordingly, which is indicative of a localization of the detected target 196 in range, and/or in depth, and/or in azimuth angle and/or depression angle. The classification processor 222 is adapted to receive the detection signal 218 and also the correlated waveform 214 and to provide an output signal 226 accordingly, which is indicative of a type of target 196.

Figure 6:
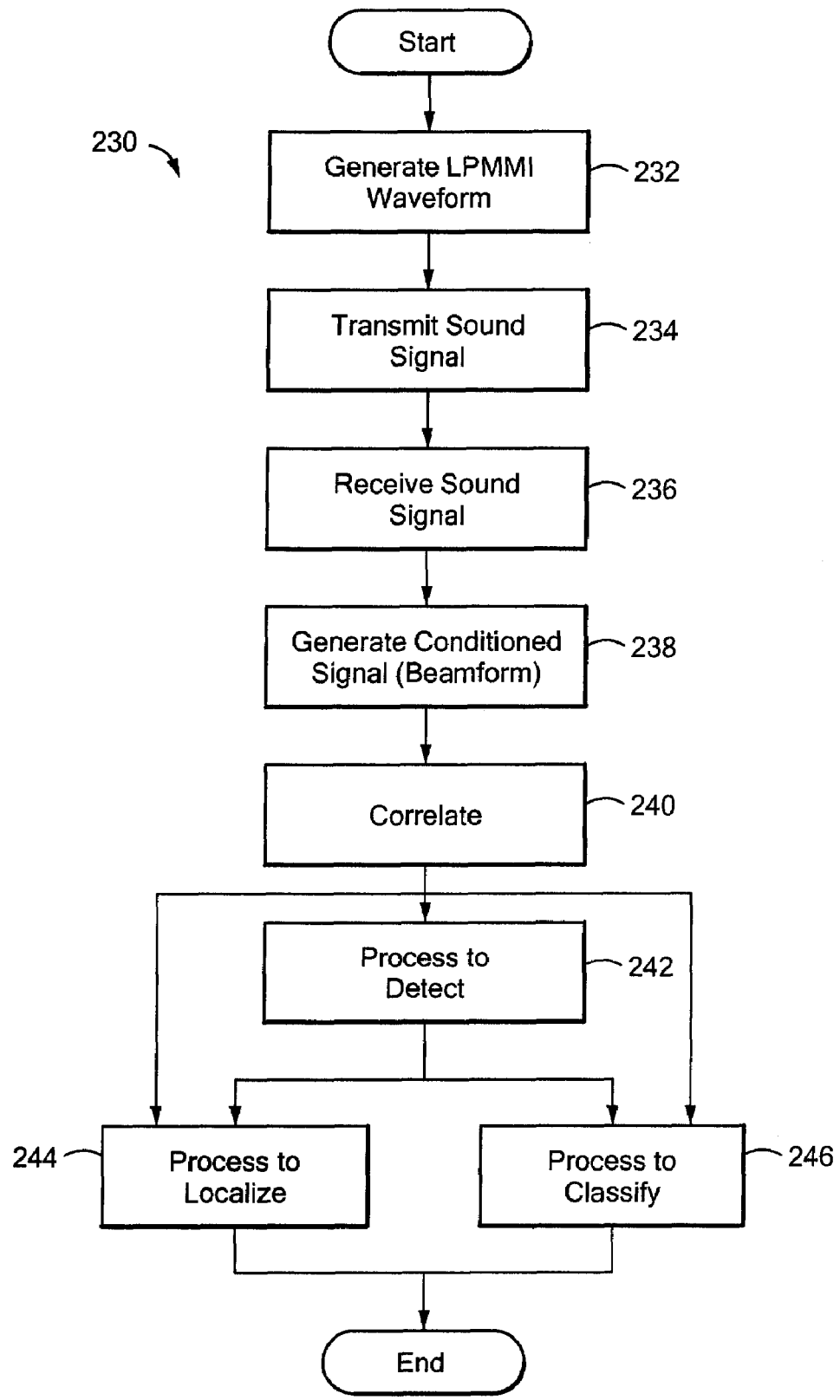
FIG. 6 is a flow chart of a method of using an LPMMI waveform in a sonar system.

It should be appreciated that FIG. 6 shows a flowchart corresponding to the below contemplated technique which would be implemented in sonar system 180 (FIG. 5). Rectangular elements (typified by element 232 in FIG. 6), herein denoted "processing blocks," represent computer software instructions or groups of instructions.

Alternatively, the processing blocks represent steps performed by functionally equivalent circuits such as a digital signal processor circuit or an application specific integrated circuit (ASIC). The flow diagram does not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 6, a method 230 of target detection used in a sonar system begins at block 232, where a low probability of marine mammal impact (LPMMI) waveform in generated. The LPMMI waveform can be a low probability of intercept waveform having a spread spectrum. The LPMMI waveform can be, but is not limited to:

An M-sequence pseudo random phase encoded signal
A binary state genetic algorithm phase encoded signal.

A spread spectrum waveform generated by means of modulation with a phase code having more than two states. A genetic algorithm generates this phase code.

A spread spectrum waveform generated by means of modulation with a phase code using Barker codes.

A spread spectrum waveform generated by means of modulation with a phase code using Gold codes.

A spread spectrum waveform generated by means of modulation with a phase code using Welti codes.

In one particular embodiment, the LPMMI waveform can have a carrier (center) frequency of about 3500 Hertz, a bandwidth of about 1000 Hertz, and a time duration of about one second in order to emulate some characteristics of conventional FM sound signals used in some forms of conventional sonar systems. However in other embodiments, the LPMMI waveform can have a carrier (center) frequency in the range of 2500 to 6000 Hertz, a bandwidth in the range of 500 to 2500 Hertz, and a time duration in the range of 10 msec to 1.5 seconds.

At block 234, a sound signal is transmitted into water in accordance with the LPMMI waveform generated at block 232. At block 236, a sound signal is received, which is associated with the transmitted sound signal transmitted at block 234. The received signal can include an echo of the transmitted sound signal from a target.

A conditioned signal is generated at block 238 from the sound signal received at block 236. Function performed at block 238 can include, but are not limited to, signal amplification, time varying gain or automatic gain control, carrier demodulation, bandpass filtering, analog to digital conversion, and beamforming. In some embodiments, the beamforming that can be provided at block 238 can result in a plurality of beamformed channels.

At block 240, the conditioned signal provided at block 240 (which can include, for example, more than one beamformed signal) is correlated with one or more versions of the LPMMI waveform generated at block 232 to provide a correlated waveform.

At block 242, the correlated waveform is processed to detect a target. At block 244, a detected target can be localized, and at block 246 the detected target can be classified. In other embodiments, any one of the blocks 242, 244, of 246 can be omitted.

Several examples of LPMMI sound signals are described above, which can be used in a sonar system as an alternative to the conventional FM (both linear and hyperbolic) sound signal. Each of these LPMMI sound signals has characteristics that result in perceived sound quite different than natural sounds produced by an Orca and also quite different than a man-made FM sound signals. This difference is evident when the spectrograms 100, 140 (FIGS. 3C, 4C, respectively) of the LPMMI sound signals are compared to the spectrogram 30 (FIG. 1B) of the Orca and to the spectrogram 60 (FIG. 2B) of the conventional HFM sound signal.

The above-described LPMMI sound signals are LPI spread spectrum sound signals having noise-like signatures over a predetermined bandwidth, as opposed to a time dependent narrowband tonal characteristic of an FM sound signal. The significant difference in the time-frequency characteristics of the spread spectrum LPMMI sound signals suggests that these LPMMI sound signals will not cause marine mammals to react in a negative manner in the presence of these LPMMI sound signals.

As described above, predicted performance of the two spread spectrum LPMMI sound signals can be evaluated by analyzing the outputs provided by subjecting these waveforms to the autocorrelation function and ambiguity functions. It is expected that each of these waveforms will have similar performance in terms of the expected theoretical correlator gain (in the presence of uncorrelated noise) as they all share identical time-bandwidth products. Each of the above-described LPMMI waveforms share a similar center frequency, time duration and bandwidth. The various performance parameters including but not limited to theoretical range resolution, theoretical correlator gain, theoretical Doppler resolution, Doppler tolerance, and side lobe interference levels in both range and Doppler are all inter-related so that optimizing a waveform for one parameter has an effect on the other parameters (often times these relationships are inversely related). The only way to establish a meaningful comparison between the example LPMMI waveforms and the example of the traditional HFM waveform is to fix the level of one performance parameter for all waveforms being evaluated while letting all others parameters vary. Predicted performance for the HFM waveform versus the two LPMMI waveforms in terms of theoretical correlation width (i.e. range resolution) for a fixed side lobe interference level is summarized in Table 1.

TABLE 1

Comparison of Autocorrelation Performance - Theoretical Range Resolution

| Waveform Type | Theoretical Range Resolution Given By 3 dB Width of Autocorrelation Peak (m) | Highest Autocorrelation Side Lobe Interference Level (dB) |
| --- | --- | --- |
| HFM Waveform With Gaussian Window ($\alpha = 1.5$) | 0.928 | −28 |
| M-sequence Phase Encoded | 0.562 | −29 |
| Genetic Algorithm Phase Encoded | 0.763 | −27 |

While particular LPMMI sound signals are described above, other LPMMI sound signals can also be generated in accordance with the present invention. Other sound signals that could be generated with the present invention include, but are not limited to:

A spread spectrum waveform generated by means of modulation with a phase code having more than two states. This phase code is generated by a genetic algorithm.

A spread spectrum waveform generated by means of modulation with a phase code using Barker codes.

A spread spectrum waveform generated by means of modulation with a phase code using Gold codes.

A spread spectrum waveform generated by means of modulation with a phase code using Welti codes.

In general, the modulation component of an LPMMI waveform is selected to reduce a behavioral response from a marine mammal from that which would occur when transmitting another sound signal in accordance with another waveform having approximately the same time duration component, approximately the same bandwidth component, and approximately the same center frequency component as the LPMMI waveform but having a modulation component comprising a frequency modulation.

Above-described performance comparisons made between the various waveforms described herein are based on subjecting the various man made waveforms to the autocorrelation and ambiguity functions. Five parameters derived from these functions are:

1) A theoretical range resolution provided by the waveform compression that results from matched filter processing (this is synonymous with the correlation width of the waveform) at zero Doppler
2) A theoretical Doppler resolution provided by the correlated waveform frequency content (this is synonymous with computing the power spectrum of the output of the autocorrelation function for the waveform)
3) The theoretical side lobe interference level in the time/range domain derived by evaluation of the output from subjecting the waveform to the autocorrelation function in the absence of noise
4) The theoretical side lobe interference level in the Doppler domain derived by evaluation of the output from subjecting the waveform to the ambiguity function in the absence of noise
5) An indication of the expected degradation in regards to the gain expected from the matched filter as the input waveform is subjected to differing degrees of Doppler induced distortion. This is derived from the ambiguity function.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A sonar system, comprising:
    a low probability of marine mammal impact waveform generator adapted to generate a low probability of marine mammal impact (LPMMI) waveform having a modulation component; and
    a sonar transmitter coupled to the waveform generator and configured to transmit an LPMMI sound signal into the water in accordance with the LPMMI waveform, wherein the LPMMI waveform comprises a low probability of intercept (LPI) waveform having a spread spectrum, and wherein the LPMMI waveform has a center frequency component in the range of 2500 to 6000 Hertz, a bandwidth component in the range of 500 to 2500 Hertz, and a time duration component in the range of 10 msec to 1.5 seconds, wherein the modulation component of the LPMMI waveform is selected to reduce a behavioral response from a marine mammal by causing the associated LPMMI sound signal to sound unlike a killer whale sound as perceived by the marine mammal as compared to a behavioral response and associated marine mammal perception that would occur when transmitting another sound signal in accordance with another waveform having approximately the same time duration component, approximately the same bandwidth component, and approximately the same center frequency component as the LPMMI waveform but having a modulation component comprising a frequency modulation.

2. The sonar system of claim 1, wherein the LPMMI waveform comprises at least one of an M-sequence pseudo random phase encoded signal, a Barker code phase encoded signal, a Welti code phase encoded signal, a Gold code phase encoded signal, or a genetic algorithm phase encoded signal.

3. The sonar system of claim 1, wherein the LPMMI waveform has a center frequency component of about 3500 Hertz, a bandwidth component of about 1000 Hertz, and a time duration component of about one second.

4. The sonar system of claim 1, wherein the LPMMI waveform comprises an M-sequence pseudo random phase encoded signal.

5. The sonar system of claim 4, wherein the LPMMI waveform has a center frequency component of about 3500 Hertz, a bandwidth component of about 1000 Hertz, and a time duration component of about one second.

6. The sonar system of claim 4, wherein the LPMMI waveform has a center frequency component in the mid frequency range of 2500 to 6000 Hertz, a bandwidth component in the range of 500 to 2500 Hertz, and a time duration component in the range of the range of 10 msec to 1.5 seconds.

7. The sonar system of claim 1, wherein the LPMMI waveform comprises a genetic algorithm phase encoded signal.

8. The sonar system of claim 7, wherein the LPMMI has a center frequency component of about 3500 Hertz, a bandwidth component of about 1000 Hertz, and a time duration component of about one second.

9. The sonar system of claim 7, wherein the LPMMI waveform has a center frequency component in the mid frequency range of 2500 to 6000 Hertz, a bandwidth component in the range of 500 to 2500 Hertz, and a time duration component in the range of 10 msec to 1.5 seconds.

10. The sonar system of claim 7, wherein the genetic algorithm is selected to improve a correlation of a received sound signal.

11. The sonar system of claim 7, wherein the genetic algorithm is selected to improve a detection accuracy, a localization accuracy, a tracking accuracy, or a classification accuracy provided by the sonar system.

12. The sonar system of claim 7, wherein the genetic algorithm is selected to increase a probability of detection of the sonar system or to reduce a false alarm rate of the sonar system.

13. The sonar system of claim 7, wherein the genetic algorithm is selected to reduce an acoustic power transmitted by the sonar system.

14. The sonar system of claim 1, further comprising:
    a sonar receiver adapted to receive a sound signal associated with the transmitted sound signal and to generate a conditioned signal in accordance with the received sound signal; and
    a correlation processor adapted to correlate the conditioned signal with a version of the LPMMI waveform and to generate a correlated signal accordingly; and
    at least one of: a detection processor adapted to detect a target and to provide a detection signal in response to the correlated signal, a localization processor adapted to localize the target in response to the detection, or classification processor adapted to classify the target in response to the detection.

15. The sonar system of claim 1, wherein the a low probability of marine mammal impact waveform generator is further adapted to generate another low probability of marine mammal impact (LPMMI) waveform having at least one of: a different modulation component, a different time duration component, a different bandwidth component, or a different center frequency component, and wherein the sonar transmitter is further adapted to transmit another sound signal into the water in accordance with the another low probability of marine mammal impact waveform.

16. A method of target detection used in a sonar system; comprising:
    generating a low probability of marine mammal impact (LPMMI) waveform having a modulation component; and transmitting an LPMMI sound signal into the water in accordance with the LPMMI waveform, wherein the LPMMI waveform comprises a low probability of intercept (LPI) waveform having a spread spectrum, and wherein the LPMMI waveform has a center frequency component in the range of 2500 to 6000 Hertz, a bandwidth component in the range of 500 to 2500 Hertz, and a time duration component in the range of 10 msec to 1.5 seconds, wherein the modulation component of the LPMMI waveform is selected to reduce a behavioral response from a marine mammal by causing the associated LPMMI sound signal to sound unlike a killer whale sound as perceived by the marine mammal as compared to a behavioral response and associated marine mammal perception that would occur when transmitting another sound signal in accordance with another waveform having approximately the same time duration component, approximately the same bandwidth component, and approximately the same center frequency component as the LPMMI waveform but having a modulation component comprising a frequency modulation.

17. The sonar system of claim 16, wherein the LPMMI waveform comprises at least one of an M-sequence pseudo random phase encoded signal, a Barker code phase encoded signal, a Welti code phase encoded signal, A Gold code phase encoded signal, or a genetic algorithm phase encoded signal.

18. The method of claim 16, wherein the LPMML waveform has a center frequency component of about 3500 Hertz, a bandwidth component of about 1000 Hertz, and a time duration component of about one second.

19. The method of claim 16, wherein the LPMMI waveform comprises an M-sequence pseudo random phase encoded signal.

20. The method of claim 19, wherein the LPMMI has a center frequency component of about 3500 Hertz, a bandwidth component of about 1000 Hertz, and a time duration component of about one second.

21. The method of claim 19, wherein the LPMMI has a center frequency component of 2500 to 6000 Hertz, a bandwidth component in the range of 500 to 2500 Hertz, and a time duration component in the range of the range of 10 msec to 1.5 seconds.

22. The method of claim 16, wherein the LPMMI waveform comprises a genetic algorithm phase encoded signal.

23. The method of claim 22, wherein the LPMMI has a center frequency component of about 3500 Hertz, a bandwidth component of about 1000 Hertz, and a time duration component of about one second.

24. The method of claim 22, wherein the LPMMI waveform has a center frequency component in the range of 2500 to 6000 Hertz, a bandwidth component in the range of 500 to 2500 Hertz, and a time duration component in the range of 10 msec to 1.5 seconds.

25. The method of claim 22, wherein the genetic algorithm is selected to optimize a correlation of a received sound signal.

26. The method of claim 22, wherein the genetic algorithm is selected to improve a detection accuracy, a localization accuracy, a tracking accuracy, or a classification accuracy provided by the sonar system.

27. The method of claim 22, wherein the genetic algorithm is selected to increase a probability of detection of the sonar system or to reduce a false alarm rate of the sonar system.

28. The method of claim 22, wherein the genetic algorithm is selected to reduce an acoustic power transmitted by the sonar system.

29. The method of claim 16, further comprising:
receiving a sound signal associated with the transmitted sound signal;
generating a received waveform in accordance with the received sound signal;
correlating the received waveform with a version of the LPMMI waveform to provide a correlation signal; and
at least one of: detecting a target and providing a detection signal in response to the correlation signal to provide a detection signal, localizing the target in response to the detection signal, or classifying a target in response to the detection signal.

30. The method of claim 16, further comprising:
generating another low probability of marine mammal impact (LPMMI) waveform having at least one of: a different modulation component, a different time duration component, a different bandwidth component, or a different center frequency component; and
transmitting the another sound signal into water in accordance with the another low probability of marine mammal impact waveform.

* * * * *

UNITED STATES PATENT AND TRADEMARK OFFICE
CERTIFICATE OF CORRECTION

PATENT NO. : 7,486,591 B2
APPLICATION NO. : 11/548418
DATED : February 3, 2009
INVENTOR(S) : James H. Rooney, III et al.

It is certified that error appears in the above-identified patent and that said Letters Patent is hereby corrected as shown below:

Col. 1, line 45-46, delete "such as system" and replace with --such a system--.

Col. 2, line 30, delete "has first" and replace with --has a first--.

Col. 3, line 27, delete "mid frequency" and replace with --mid-frequency--.

Col. 4, line 11, delete "mid frequency" and replace with --mid-frequency--.

Col. 4, line 67, delete "of" and replace with --with--.

Col. 5, line 67, delete "man made" and replace with --man-made--.

Col. 6, line 21, delete "by time the time" and replace with --by the time--.

Col. 6, line 32, delete "mid frequency" and replace with --mid-frequency--.

Col. 7, line 6, delete "modem" and replace with --modern--.

Col. 7, line 35, delete "lobes" and replace with --lobe--.

Col. 8, line 7, delete "dimension it demonstrates" and replace with --dimension demonstrates--.

Col. 8, line 13, delete "time distorted" and replace with --time-distorted--.

Col. 9, line 13, delete "used to that can be" and replace with --that can be--.

Col. 9, line 35, delete "cycle a" and replace with --cycle, a--.

Col. 10, line 31, delete "and" and replace with --an--.

Col. 13, line 21, delete "man made" and replace with --man-made--.

Col. 14, line 5, delete "phase" and replace with --phases--.

Col. 14, line 7, delete "FIG. 3C a" and replace with --FIG. 3C, a--.

UNITED STATES PATENT AND TRADEMARK OFFICE
CERTIFICATE OF CORRECTION

PATENT NO. : 7,486,591 B2
APPLICATION NO. : 11/548418
DATED : February 3, 2009
INVENTOR(S) : James H. Rooney, III et al.

It is certified that error appears in the above-identified patent and that said Letters Patent is hereby corrected as shown below:

Col. 14, line 20, delete "correspond" and replace with --corresponds--.

Col. 14, line 32, delete "man made" and replace with --man-made--.

Col. 14, line 45, delete "they" and replace with --the--.

Col. 15, line 33, delete "generated." and replace with --generated waveform.--.

Col. 18, line 9, delete "man made" and replace with --man-made--.

Col. 18, line 21, delete "they" and replace with --the--.

Col. 18, line 43, delete "spread-spectrum" and replace with --spread spectrum--.

Col. 19, line 12, delete "signal" and replace with --signal.--.

Col. 19, line 57-58, delete "to a provide and" and replace with --to provide an--.

Col. 20, line 12, delete "the of" and replace with --of the--.

Col. 20, line 62, delete "in" and replace with --is--.

Col. 20, line 66, delete "signal" and replace with --signal.--.

Col. 21, line 30, delete "analog to digital" and replace with --analog-to-digital--.

Col. 21, line 42, delete "of" and replace with --or--.

Col. 21, line 50, delete "signals." and replace with --signal.--.

Col. 22, line 65, delete "man made" and replace with --man-made--.

Col. 24, line 9, delete "mid frequency" and replace with --mid-frequency--.

Col. 24, line 12, delete "the range of the range of" and replace with --the range of--.

Col. 24, line 20, delete "mid frequency" and replace with --mid-frequency--.

UNITED STATES PATENT AND TRADEMARK OFFICE
CERTIFICATE OF CORRECTION

PATENT NO. : 7,486,591 B2
APPLICATION NO. : 11/548418
DATED : February 3, 2009
INVENTOR(S) : James H. Rooney, III et al.

It is certified that error appears in the above-identified patent and that said Letters Patent is hereby corrected as shown below:

Col. 25, line 25, delete ", A" and replace with --, a--.

Col. 25, line 27, delete "LPMML" and replace with --LPMMI--.

Col. 25, line 41, delete "in the range of the range of" and replace with --in the range of--.

Signed and Sealed this

Eighteenth Day of August, 2009

David J. Kappos
*Director of the United States Patent and Trademark Office*